US012793639B2

(12) United States Patent
Lee et al.

(10) Patent No.: US 12,793,639 B2
(45) Date of Patent: Nov. 10, 2026

(54) DISPLAY DEVICE AND ELECTRONIC DEVICE INCLUDING THE SAME

(71) Applicant: Samsung Display Co., Ltd., Yongin-si (KR)

(72) Inventors: Jiyoung Lee, Yongin-si (KR); Hyunyoung Choi, Yongin-si (KR); Sang-Gu Lee, Yongin-si (KR); Hyung Uk Cho, Yongin-si (KR); Jisong Chae, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/247,734

(22) Filed: Jun. 24, 2025

(65) Prior Publication Data

US 2026/0004732 A1 Jan. 1, 2026

(30) Foreign Application Priority Data

Jun. 27, 2024 (KR) ........................ 10-2024-0084311

(51) Int. Cl.
*G09G 3/3233* (2016.01)

(52) U.S. Cl.
CPC ... *G09G 3/3233* (2013.01); *G09G 2300/0426* (2013.01); *G09G 2300/0819* (2013.01); *G09G 2300/0852* (2013.01); *G09G 2300/0861* (2013.01); *G09G 2310/08* (2013.01)

(58) Field of Classification Search
CPC ......... G09G 3/3233; G09G 2300/0426; G09G 2300/0819; G09G 2300/0852; G09G 2300/0861; G09G 2310/0251; G09G 2310/08
See application file for complete search history.

(56) References Cited

U.S. PATENT DOCUMENTS

| | | | | |
|---|---|---|---|---|
| 8,289,234 | B2 | 10/2012 | Kim | |
| 2010/0079357 | A1 | 4/2010 | Ozawa et al. | |
| 2011/0063275 | A1 | 3/2011 | Imamura et al. | |
| 2021/0027702 | A1 | 1/2021 | Park et al. | |
| 2022/0084472 | A1* | 3/2022 | Kim ..................... | G09G 3/3291 |
| 2022/0230581 | A1* | 7/2022 | Cho ......................... | G09G 3/32 |
| 2024/0112633 | A1 | 4/2024 | Hong et al. | |

FOREIGN PATENT DOCUMENTS

KR 100635509 B1 10/2006

* cited by examiner

*Primary Examiner* — Deeprose Subedi
(74) *Attorney, Agent, or Firm* — CANTOR COLBURN LLP

(57) ABSTRACT

A pixel in a display device includes a light emitting element connected to a first power line, a first transistor connected between a cathode of the light emitting element and a second power line, a second transistor connected between a second node and a data line, a first capacitor connected between a first node and the second node, a third transistor connected between the first electrode of the first transistor and the first node, a second capacitor connected between the second node and the first power line, and a fourth transistor that initializes the second node in response to a second scan signal during an initialization period.

24 Claims, 22 Drawing Sheets

DISPLAY DEVICE AND ELECTRONIC DEVICE INCLUDING THE SAME

This application claims priority to Korean Patent Application No. 10-2024-0084311, filed on Jun. 27, 2024, and all the benefits accruing therefrom under U.S.C. § 119, the content of which in its entirety is herein incorporated by reference.

BACKGROUND

(1) Field

Embodiments of the disclosure described herein relate to a display device and an electronic device including the display device, and more particularly, relate to a display device with improved display quality and an electronic device including the display device.

(2) Description of the Related Art

Among display devices, a light emitting display device displays an image by using a light emitting diode that generates light through the recombination of electrons and holes. The light emitting display device may be driven with low power while providing a fast response speed.

The light emitting display device typically includes pixels connected to data lines and scan lines. Each of the pixels generally includes a light emitting diode, and a circuit unit for controlling the amount of current flowing to the light emitting diode. In response to a data signal, the circuit unit may control the amount of current that flows from a terminal, to which a first driving voltage is applied, to a terminal, to which a second driving voltage is applied, via the light emitting diode. In this case, light of predetermined luminance is generated to correspond to the amount of current flowing through the light emitting diode.

SUMMARY

Embodiments of the disclosure provide a display device including a display panel having a simplified circuit configuration and an electronic device including the display device.

According to an embodiment, a display device includes a display panel including a pixel. In such an embodiment, the pixel includes a light emitting element including an anode connected to a first power line and a cathode, a first transistor connected between the cathode and a second power line, where the first transistor operates based on a potential of a first node, a second transistor connected between a second node and a data line, where second transistor receives a first scan signal, a first capacitor between the first node and the second node, a third transistor connected between a first electrode of the first transistor and the first node, where the third transistor receives a second scan signal, a second capacitor connected between the second node and the first power line, and a fourth transistor which initializes the second node in response to the second scan signal during an initialization period.

According to an embodiment, a display device includes a display panel including a pixel, a first scan line, a second scan line, an emission control line, a first power line, a second power line, and a data line, a first scan driving circuit connected to the first scan line, a second scan driving circuit connected to the second scan line, and an emission driving circuit connected to the emission control line.

In such an embodiment, the pixel includes a light emitting element including an anode connected to the first power line and a cathode, a first transistor connected between the cathode and the second power line, where the first transistor operates based on a potential of a first node, a second transistor connected between a second node and the data line, and connected to the first scan line, a first capacitor between the first node and the second node, a third transistor connected between a first electrode of the first transistor and the first node, and connected to the second scan line, an emission control transistor connected between the first electrode of the first transistor and the cathode, and connected to an emission control line, a second capacitor connected between the second node and the first power line, and a fourth transistor connected to the second node and the second scan line, where the fourth transistor initializes the second node in response to a second scan signal transmitted thereto through the second scan line during an initialization period.

According to an embodiment, an electronic device includes a display panel including a pixel, a panel driver which drives the display panel, a driving controller which controls a driving of the panel driver, and a main processor which provides an image signal to the driving controller.

In such an embodiment, the pixel includes a light emitting element including an anode connected to a first power line and a cathode, a first transistor connected between the cathode and a second power line, where the first transistor operates based on a potential of a first node, a second transistor connected between a second node and a data line, where the second transistor receives a first scan signal, a first capacitor between the first node and the second node, a third transistor connected between a first electrode of the first transistor and the first node, where the third transistor receives a second scan signal, a second capacitor connected between the second node and the first power line, and a fourth transistor which initializes the second node in response to the second scan signal during an initialization period.

BRIEF DESCRIPTION OF THE DRAWINGS

The above and other features of embodiments of the disclosure will become apparent by describing in detail embodiments thereof with reference to the accompanying drawings.

DETAILED DESCRIPTION

Figure 1:
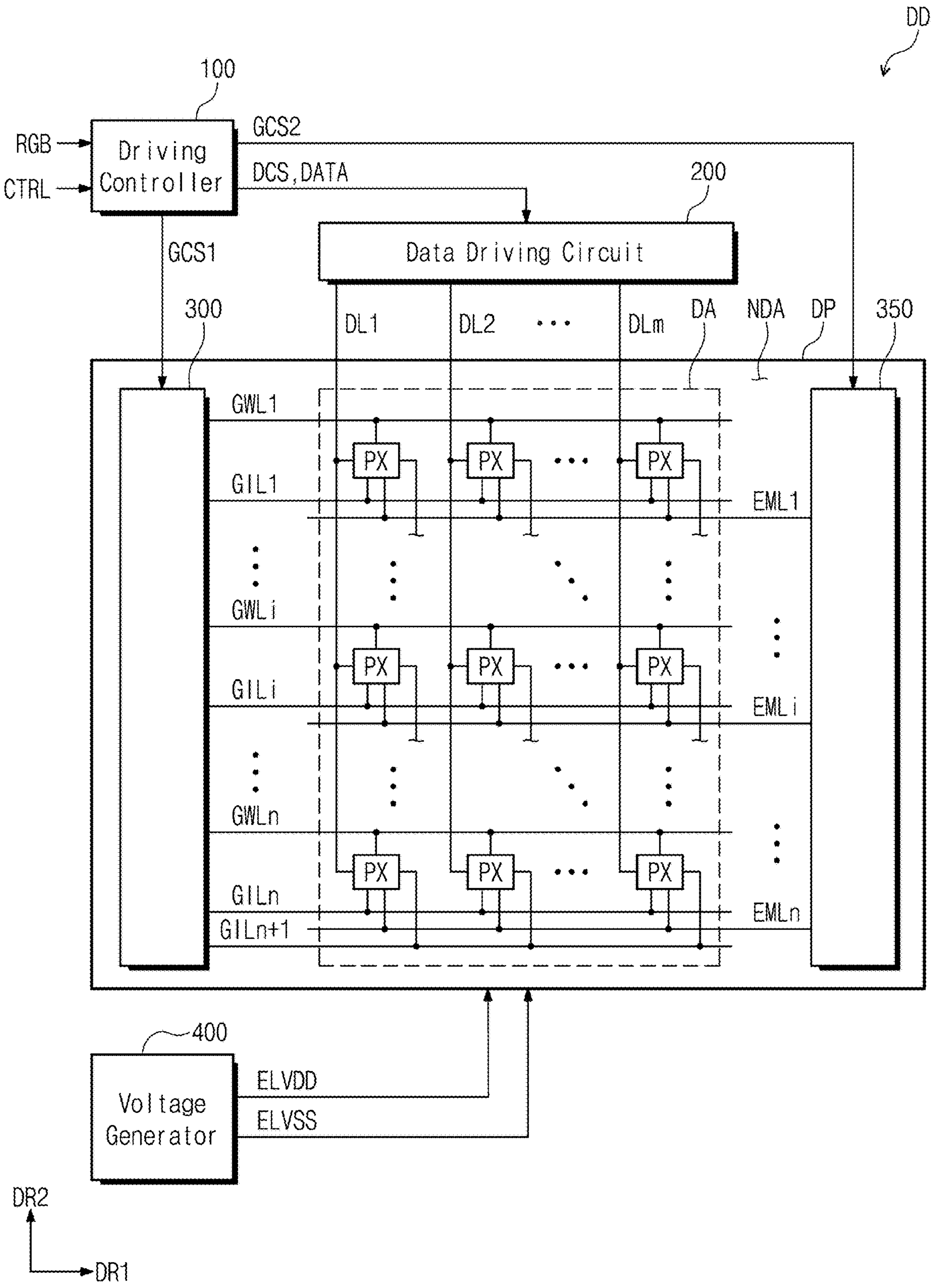
FIG. 1 is a block diagram of a display device, according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "on" another element, it can be directly on the other element or intervening elements may be present therebetween. In contrast, when an element is referred to as being "directly on" another element, there are no intervening elements present.

In the specification, the expression that a first component (or region, layer, part, portion, etc.) is "connected with", or "coupled with" a second component means that the first component is directly connected with, or coupled with the second component or means that a third component is interposed therebetween.

The same reference numerals refer to the same components. Also, in drawings, the thickness, ratio, and dimension of components are exaggerated for effectiveness of description of technical contents.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value Unless otherwise defined, all terms (including technical terms and scientific terms) used in the specification have the same meaning as commonly understood by one skilled in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the disclosure will be described with reference to accompanying drawings.

Figure 2:
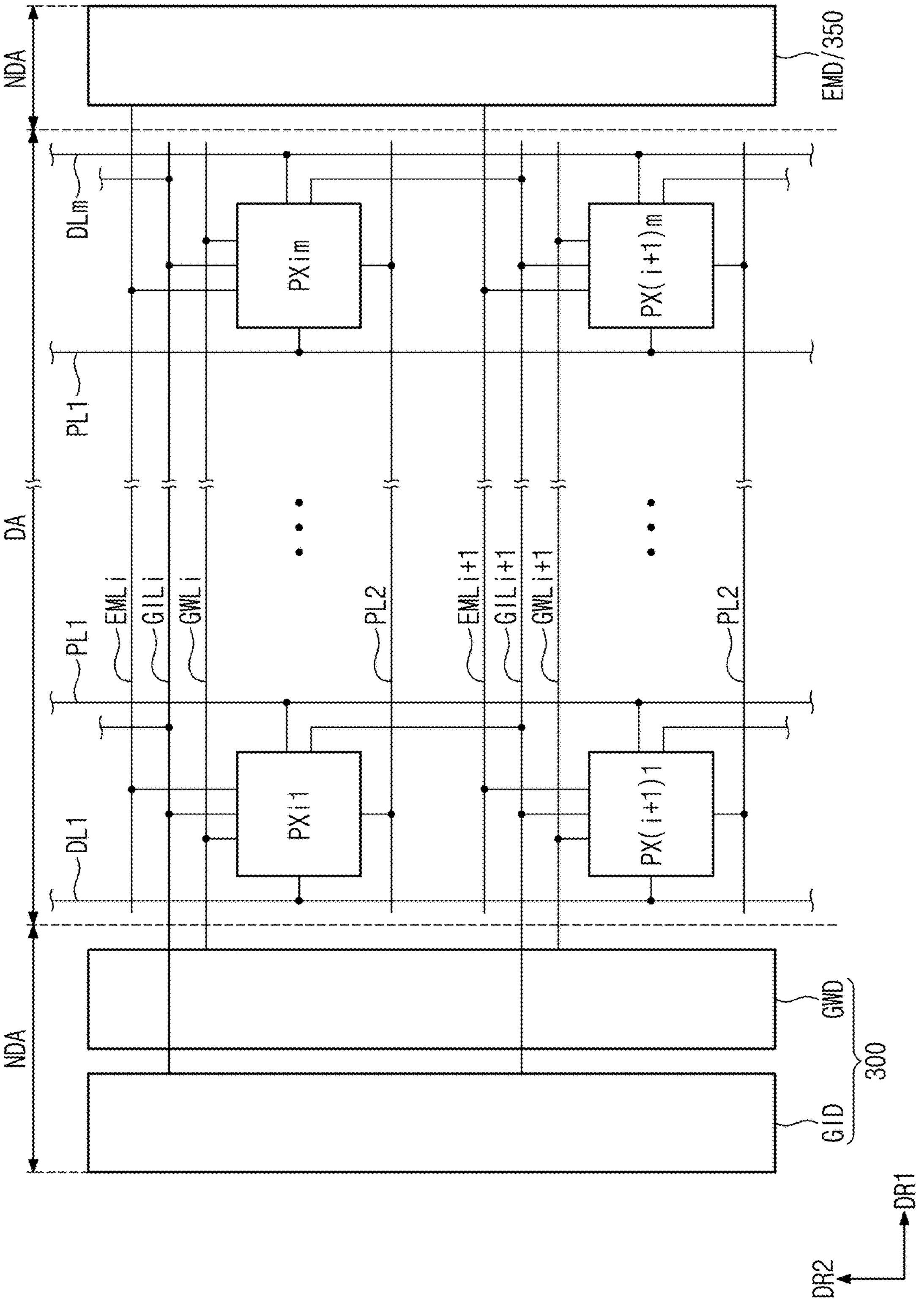
FIG. 2 is a block diagram of first and second gate driving circuits shown in FIG. 1.

FIG. 1 is a block diagram of a display device DD, according to an embodiment of the disclosure. FIG. 2 is a block diagram of first and second gate driving circuits 300 and 350 shown in FIG. 1.

Referring to FIG. 1, an embodiment of the display device DD may include a display panel DP, a driving controller 100, and a panel driver. According to an embodiment of the disclosure, the panel driver may include a data driving circuit 200 (or a data driver), a first gate driving circuit 300, a second gate driving circuit 350, and a voltage generator 400.

The display panel DP may include a display area DA and a non-display area NDA surrounding at least part of the display area DA. The display panel DP may include a plurality of pixels PX placed in the display area DA. The display panel DP may include write scan lines GWL1 to GWLn, initialization scan lines GIL1 to GILn+1, and emission control lines EML1 to EMLn. The write scan lines GWL1 to GWLn may be referred to as "first scan lines", and two adjacent initialization scan lines of the initialization scan lines GIL1 to GILn+1 may be referred to as "second scan lines" and "third scan lines", respectively. For example, referring to FIG. 2, an i-th initialization scan line GILi may be referred to as "third scan lines", and an (i+1)-th initialization scan line GILi+1 may be referred to as "second scan lines".

The driving controller 100 receives an image signal RGB and a control signal CTRL from an outside (or from an external processor). The driving controller 100 generates an image data signal DATA by converting a data format of the image signal RGB to be suitable for the interface specification of the data driving circuit 200. The driving controller 100 outputs a first gate control signal GCS1, a data control signal DCS, and a second gate control signal GCS2 based on the image signal RGB and the control signal CTRL.

The data driving circuit 200 (or a data driver) receives the data control signal DCS and the image data signal DATA from the driving controller 100. The data driving circuit 200 converts the image data signal DATA into data signals and then outputs the data signals to data lines DL1 to DLm. The data signals refer to analog voltages corresponding to grayscale values of the image data signal DATA. The data lines DL1 to DLm may be arranged in a first direction DR1, and each of the data lines DL1 to DLm may extend in a second direction DR2.

The first and second gate driving circuits 300 and 350 may be placed in the non-display area NDA of the display panel DP. In an embodiment, for example, the first gate driving circuit 300 may be positioned adjacent to a first side (e.g., left side) of the display area DA, and the second gate driving circuit 350 may be positioned adjacent to a second side (e.g., right side) of the display area DA, which is different from the first side. In an embodiment, for example, the second side may be opposite to the first side. In an embodiment, as shown in FIG. 1, the first and second gate driving circuits 300 and 350 may be respectively positioned on opposite sides of the display area DA, but the disclosure is not limited thereto. In another embodiment, for example, the first and second gate driving circuits 300 and 350 may be positioned adjacent to one of the first side and the second side of the display panel DP. In an embodiment, the first and second gate driving circuits 300 and 350 may be integrated into one circuit (e.g., a single circuit chip).

Figure 3:
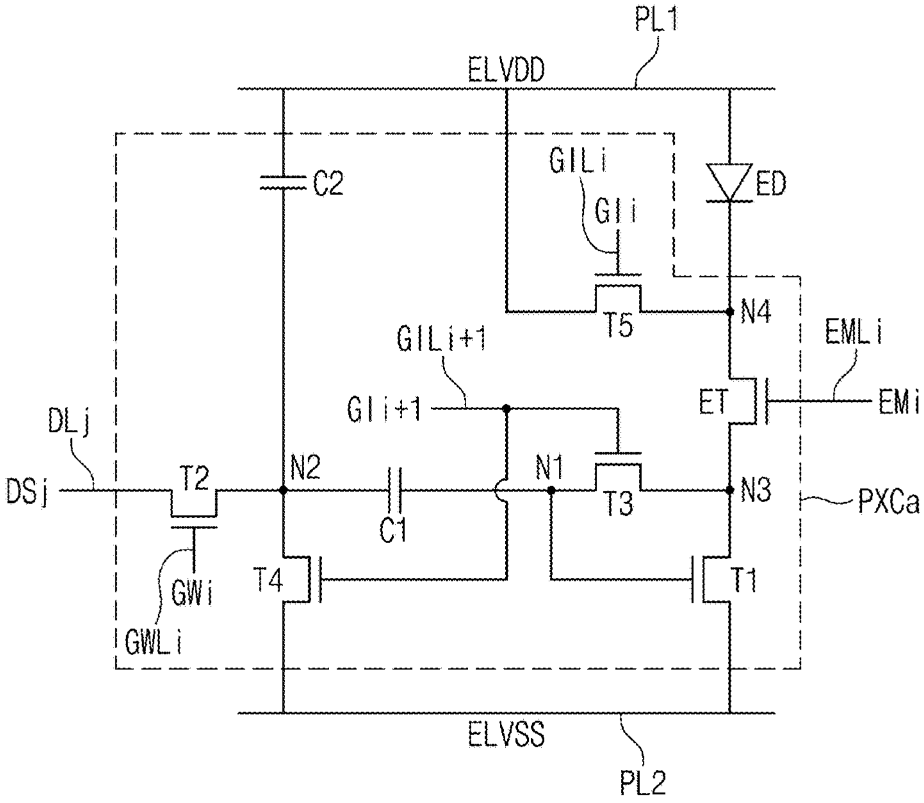
FIG. 3 is a circuit diagram of a pixel, according to an embodiment of the disclosure.

Each of a plurality of pixels PX according to an embodiment of the disclosure includes a light emitting element ED (see FIG. 3) and a pixel circuit PXCa (see FIG. 3) that controls light emission of the light emitting element ED (see FIG. 3).

The pixel circuit PXCa may include at least one or more transistors and at least one or more capacitors. The first and second gate driving circuits 300 and 350 may include transistors formed through the same process as the pixel circuit PXCa. The pixel circuit PXCa may be referred to as a "pixel driver".

In an embodiment, for example, the first gate driving circuit 300 may be connected to the write scan lines GWL1 to GWLn and the initialization scan lines GIL1 to GILn+1. The first gate driving circuit 300 receives the first gate control signal GCS1 from the driving controller 100. The first gate driving circuit 300 may output write scan signals and initialization scan signals to the write scan lines GWL1 to GWLn and the initialization scan lines GIL1 to GILn+1 in response to the first gate control signal GCS1, respectively.

In an embodiment, for example, the second gate driving circuit 350 may be connected to the emission control lines EML1 to EMLn. The second gate driving circuit 350 may output emission control signals to the emission control lines EML1 to EMLn in response to the second gate control signal GCS2 from the driving controller 100.

The write scan lines GWL1 to GWLn, the initialization scan lines GIL1 to GILn+1, and the emission control lines EML1 to EMLn may each extend in the first direction DR1. The write scan lines GWL1 to GWLn, the initialization scan lines GIL1 to GILn+1, and the emission control lines EML1 to EMLn may be spaced apart from each other in the second direction DR2.

Referring to FIG. 2, the first gate driving circuit 300 may include a first scan driving circuit GWD, and a second scan driving circuit GID. The second gate driving circuit 350 may include the emission control circuit EMD. The placement order of the first and second scan driving circuits GWD and GID in the first direction DR1, which are illustrated in FIG. 2, is only an example and is not particularly limited thereto.

In an embodiment, as shown in FIG. 2, the first scan driving circuit GWD is connected to an i-th write scan line GWLi and an (i+1)-th write scan line GWLi+1, and the second scan driving circuit GID is connected to an i-th initialization scan line GILi and an (i+1)-th initialization scan line GILi+1. The emission control circuit EMD is connected to an i-th emission control line EMLi and an (i+1)-th emission control line EMLi+1. In FIG. 2, pixels PXi1, PX(i+1)1, PXim, and PX(i+1)m connected to a first data line DL1 and a m-th data line DLm are illustrated as an example.

Each of the pixels PXi1, PX(i+1)1, PXim, and PX(i+1)m may be electrically connected to three scan lines, one emission control line, and one data line. In an embodiment, for example, pixels in an i-th row may be connected to the i-th write scan line GWLi, the i-th initialization scan line GILi, the (i+1)-th initialization scan line GILi+1, and the i-th emission control line EMLi. A first column of pixels may be connected to the first data line DL1. However, an embodiment is not limited thereto. Each of the pixels PXi1, PX(i+1)1, PXim, and PX(i+1)m may be connected to scan lines of which the number is greater than two.

Referring to FIGS. 1 and 2, the voltage generator 400 (or a power supply unit) generates voltages used to operate the display panel DP. In an embodiment, the voltage generator 400 may generate a first driving voltage ELVDD and a second driving voltage ELVSS. Alternatively, the voltage generator 400 may further generate first and second initialization voltages Vcint and Vint (see FIG. 14).

Each of the pixels PXi1, PX(i+1)1, PXim, and PX(i+1)m may be connected to a first power line PL1 and a second power line PL2. The first power line PL1 receives the first driving voltage ELVDD from the voltage generator 400. The second power line PL2 receives the second driving voltage ELVSS from the voltage generator 400. Alternatively, each of the pixels PXi1, PX(i+1)1, PXim, and PX(i+1)m may be further connected to the first and second initialization voltages lines VL1 and VL2 (see FIG. 14). In such an embodiment, the first and second initialization voltages lines VL1 and VL2 may receive the first and second initialization voltages Vcint and Vint (see FIG. 14) from the voltage generator 400.

Figure 4:
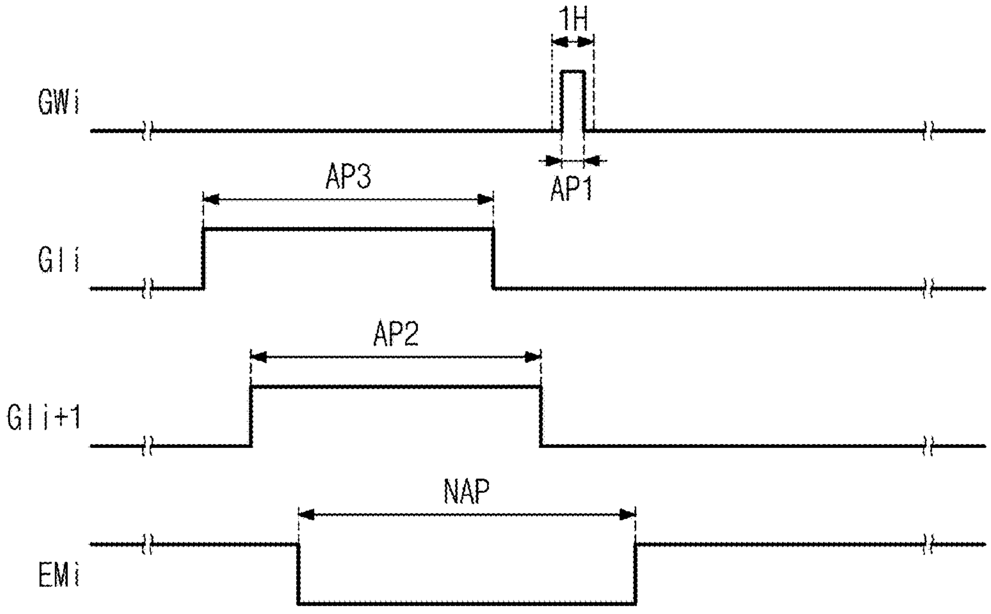
FIG. 4 is a waveform diagram illustrating signals applied to a pixel shown in FIG. 3.

FIG. 3 is a circuit diagram of a pixel PXij, according to an embodiment of the disclosure. FIG. 4 is a waveform diagram of signals applied to the pixel PXij shown in FIG. 3.

FIG. 3 representatively shows an embodiment of the pixel PXij connected to the i-th write scan line GWLi among the write scan lines GWL1 to GWLn (see FIG. 1) and a j-th data line DLj among the plurality of data lines DL1 to DLm (see FIG. 1). The pixel PXij is connected to the i-th initialization scan line GILi and the (i+1)-th initialization scan line GILi+1 among the initialization scan lines GIL1 to GILn+1 (see FIG. 1), and is connected to the i-th emission control line EMLi among the emission control lines EML1 to EMLn (see FIG. 1).

The pixel PXij may include the pixel circuit PXCa (or a pixel driving circuit) and the light emitting element ED electrically connected to the pixel circuit PXCa. In an embodiment, as shown in FIG. 3, the pixel circuit PXCa may include six transistors (referred to as "first to fifth transistors T1 to T5 and an emission control transistor ET"), and two capacitors (referred to as "a first capacitor C1 and a second capacitor C2"), but not being limited thereto. In another embodiment of the disclosure, one of the six transistors of the pixel circuit PXCa may be omitted, or an additional transistor may be further included in the pixel circuit PXCa.

The i-th write scan line GWLi may provide an i-th write scan signal GWi to the pixel PXij; the i-th initialization scan line GILi may transmit an i-th initialization scan signal GIi to the pixel PXij, and the (i+1)-th initialization scan line GILi+1 may provide an (i+1)-th initialization scan signal GIi+1 to the pixel PXij. The i-th write scan signal GWi may be referred to as a "first scan signal", the i-th initialization scan signal GIi may be referred to as a "third scan signal", and the (i+1)-th initialization scan signal GIi+1 may be referred to as a "second scan signal". The i-th emission control line EMLi may provide the i-th emission control signal EMi to the pixel PXij. The j-th data line DLj may transmit the j-th data signal DSj to the pixel PXij. The j-th data signal DSj may have a voltage level corresponding to a grayscale value of the image data signal DATA (see FIG. 1) output from the driving controller 100 (see FIG. 1).

In such an embodiment, the pixel PXij may be connected to the first power line PL1 that transmits the first driving voltage ELVDD and the second power line PL2 that transmits the second driving voltage ELVSS. The first driving voltage ELVDD may have a higher voltage level than the second driving voltage ELVSS. According to an embodiment of the disclosure, for example, the first driving voltage ELVDD may be about 8.4 volts (V), and the second driving voltage ELVSS may be about zero (0) V.

In an embodiment, the first to fifth transistors T1 to T5 and the emission control transistor ET may each be an N-type transistor having an oxide semiconductor as a semiconductor layer.

The light emitting element ED may include an anode and a cathode. In an embodiment where the light emitting element ED is an organic light emitting element, the light emitting element ED may further include an organic layer disposed between an anode and a cathode. The anode of the light emitting element ED may be connected to the first power line PL1. In an embodiment, the anode of the light emitting element ED may be directly connected to the first power line PL1. The cathode of the light emitting element ED may be connected to the pixel circuit PXCa. The light emitting element ED may emit light to correspond to the amount of the current flowing in the first transistor T1 of the pixel circuit PXCa.

The first transistor T1 is connected between the cathode of the light emitting element ED and the second power line PL2 that transmits the second driving voltage ELVSS. The first transistor T1 may be referred to as a "driving transistor". The first transistor T1 may include a first electrode, a second electrode, and a gate electrode. The gate electrode of the first transistor T1 may be connected to a first node N1, the first electrode thereof may be connected to a third node N3, and the second electrode thereof may be connected to the second power line PL2. The first electrode may be referred to as a drain of the first transistor T1, and the second electrode may be referred to as a source of the first transistor T1. The first transistor T1 may operate based on a potential of the first node N1. In an embodiment, the first transistor T1 may further include a back gate electrode. In such an embodiment, the back gate electrode may be connected to the second electrode of the first transistor T1.

The second transistor T2 is connected between the j-th data line DLj and a second node N2 and receives the i-th write scan signal GWi. The second transistor T2 may be referred to as a "switching transistor". The second transistor T2 may include a first electrode connected to the j-th data line DLj, a second electrode connected to the second node N2, and a gate electrode connected to the i-th write scan line GWLi. The second transistor T2 may apply the j-th data signal DSj received through the j-th data line DLj to the second node N2 in response to the i-th write scan signal GWi received through the i-th write scan line GWLi.

The third transistor T3 is connected between the first node N1 and the third node N3 and receives an (i+1)-th initialization scan signal GIi+1. The third transistor T3 may be referred to as a "compensation transistor". The third transistor T3 may include a first electrode connected to the first node N1, a second electrode connected to the third node N3, and a gate electrode connected to the (i+1)-th initialization scan line GILi+1. The third transistor T3 may be turned on in response to the (i+1)-th initialization scan signal GIi+1 received through the (i+1)-th initialization scan line GILi+1 to electrically connect the first node N1 and the third node N3.

The first capacitor C1 may be connected between the first node N1 and the second node N2. The first capacitor C1 may include a first electrode connected to the first node N1 and a second electrode connected to the second node N2. The first capacitor C1 may store a difference voltage between the first node N1 and the second node N2. The first node N1 may be defined as a node connected to the gate electrode of the first transistor T1, the first electrode of the third transistor T3, and the first electrode of the first capacitor C1.

The second capacitor C2 may be connected between the second node N2 and the first power line PL1. The second capacitor C2 may include a first electrode connected to the second node N2 and a second electrode connected to the first power line PL1. The second capacitor C2 may store a difference voltage between the second node N2 and the first power line PL1. In an embodiment, for example, the capacitance of the second capacitor C2 may be equal to the capacitance of the first capacitor C1. However, the disclosure is not limited thereto. The relationship between the capacitance of the first capacitor C1 and the capacitance of the second capacitor C2 may be variously modified.

The fourth transistor T4 is connected between the second node N2 and the second power line PL2 to receive the (i+1)-th initialization scan signal GIi+1. The fourth transistor T4 may be referred to as an "initialization transistor". The fourth transistor T4 may include a first electrode connected to the second node N2, a second electrode connected to the second power line PL2, and a gate electrode connected to the (i+1)-th initialization scan line GILi+1. The fourth transistor T4 may be turned on in response to the (i+1)-th initialization scan signal GIi+1 received through the (i+1)-th initialization scan line GILi+1 to initialize the second node N2 to the second driving voltage ELVSS. The second node N2 may be defined as a node to which the second electrode of the second transistor T2, the second electrode of the first capacitor C1, the first electrode of the second capacitor C2, and the first electrode of the fourth transistor T4 are connected.

The emission control transistor ET may be connected between the light emitting element ED and the first transistor T1 and receives the i-th emission control signal EMi. The emission control transistor ET may include a first electrode connected to the cathode of the light emitting element ED (or referred to as a "fourth node N4"), a second electrode connected to the third node N3, and a gate electrode connected to the i-th emission control line EMLi. The emission control transistor ET may be turned on in response to the i-th emission control signal EMi received through the i-th emission control line EMLi to electrically connect the cathode of the light emitting element ED and the third node N3. The third node N3 may be defined as a node to which the first electrode of the first transistor T1, the second electrode of the emission control transistor ET, and the second electrode of the third transistor T3 are connected.

The fifth transistor T5 is connected between the first power line PL1 and the cathode of the light emitting element ED and receives the i-th initialization scan signal GIi. The fifth transistor T5 may include a first electrode connected to the first power line PL1, a second electrode connected to the cathode of the light emitting element ED (i.e., the fourth node N4), and a gate electrode connected to the i-th initialization scan line GILi. The fifth transistor T5 may be turned on in response to the i-th initialization scan signal GIi received through the i-th initialization scan line GILi to transmit the first driving voltage ELVDD to the cathode of the light emitting element ED (i.e., the fourth node N4). The fourth node N4 may be defined as a node to which the cathode of the light emitting element ED, the first electrode of the emission control transistor ET, and the second electrode of the fifth transistor T5 are connected.

In an embodiment, the third and fourth transistors T3 and T4 may receive a same scan signal (i.e., the (i+1)-th initialization scan signal GIi+1). Accordingly, the number of scan signals used to drive the pixel PXij may be reduced to three. In such an embodiment, the i-th initialization scan signal GIi and the (i+1)-th initialization scan signal GIi+1 may be signals output from the second scan driving circuit GID (see FIG. 2). Accordingly, the number of scan driving circuits used to drive the pixel PXij may be reduced to two. When the number of scan driving circuits is reduced, the width of the non-display area NDA (see FIG. 1) of the display panel DP (see FIG. 1) may be reduced, and thus the dead space of the display panel DP may be effectively prevented from increasing.

Referring to FIG. 4, each of the i-th write scan signal GWi, the i-th initialization scan signal GIi, the (i+1)-th initialization scan signal GIi+1, and the i-th emission control signal EMi may have an active level (or a high level) during some periods (i.e., an active period), and may have an inactive level (or a low level) during the remaining periods (i.e., an inactive period). In an embodiment where the six transistors T1 to T5 and ET described above are N-type transistors, the active level of each of the i-th write scan signal GWi, the i-th initialization scan signal GIi, the (i+1)-th initialization scan signal GIi+1, and the i-th emission control signal EMi may be at a high level. In another embodiment, where the six transistors T1 to T5 and ET are P-type transistors, the active level of each of the i-th write scan signal GWi, the i-th initialization scan signal GIi, the (i+1)-th initialization scan signal GIi+1, and the i-th emission control signal EMi may be at a low level.

The inactive period NAP of the i-th emission control signal EMi may overlap the active period AP1 of the i-th write scan signal GWi, an active period AP3 of the i-th initialization scan signal GIi, and an active period AP2 of the (i+1)-th initialization scan signal GIi+1. In an embodiment, for example, the active period AP1 of the i-th write scan signal GWi may have duration smaller than or equal to duration of a horizontal scan period (1H). The active period AP3 of the i-th initialization scan signal GIi and the active period AP2 of the (i+1)-th initialization scan signal GIi+1 may each have duration greater than duration of the horizontal scan period (1H). In an embodiment, for example, duration of the active period AP1 of the i-th write scan signal GWi may correspond to ½ or ⅓ of the duration of the horizontal scan period (1H). Duration of each of the active period AP3 of the i-th initialization scan signal GIi and the active period AP2 of the (i+1)-th initialization scan signal GIi+1 may correspond to 3 or 4 times the duration of the horizontal scan period (1H).

Figure 5A:
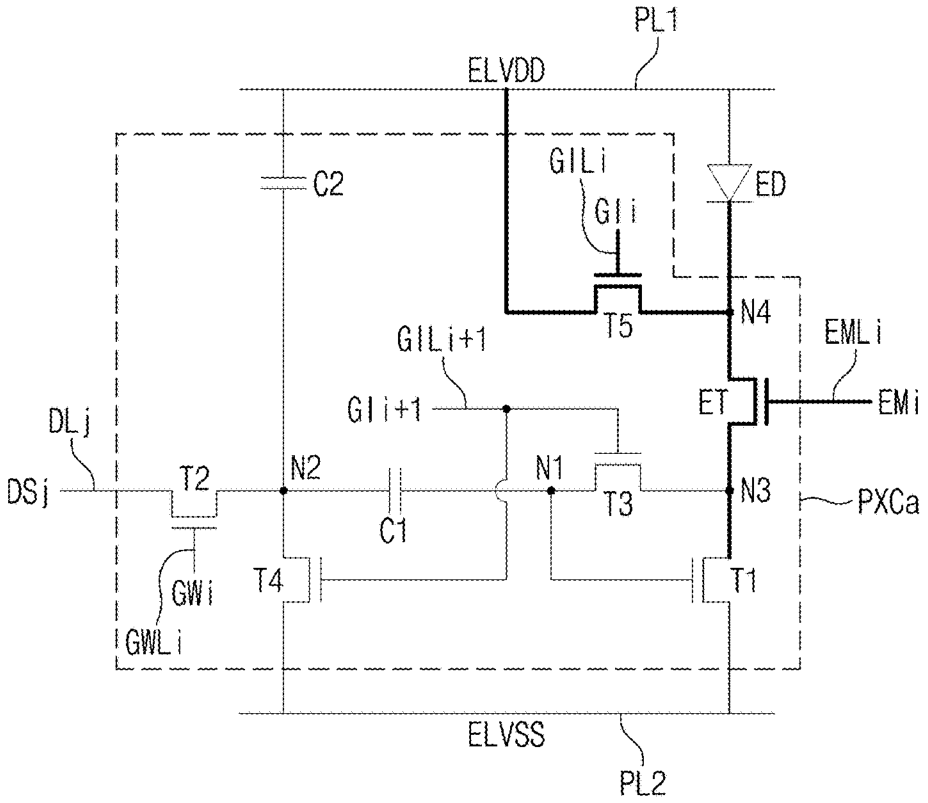
FIGS. 5A and 5B are drawings for describing an operation of a pixel during a first initialization period, according to an embodiment of the disclosure.
Figure 5B:
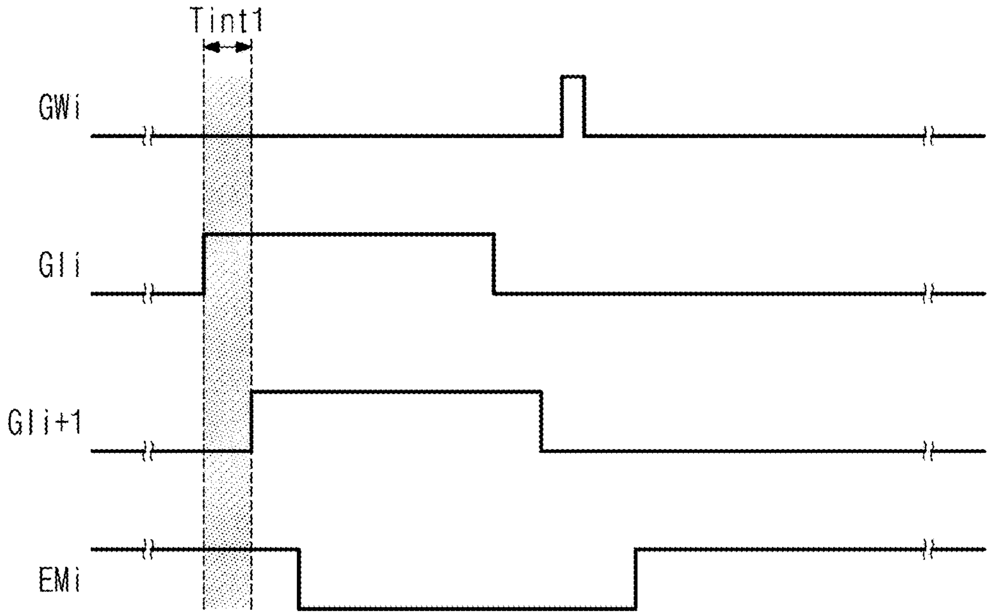

FIGS. 5A and 5B are drawings for describing an operation of the pixel PXij during a first initialization period Tint1, according to an embodiment of the disclosure.

Referring to FIGS. 5A and 5B, during the first initialization period Tint1, the i-th initialization scan signal GIi and the i-th emission control signal EMi may have active levels (e.g., high levels), and the i-th write scan signal GWi and the (i+1)-th initialization scan signal GIi+1 may have inactive levels (e.g., low levels).

During the first initialization period Tint1, the fifth transistor T5 is turned on in response to the i-th initialization scan signal GIi. Accordingly, during the first initialization period Tint1, the cathode of the light emitting element ED (or the fourth node N4) is initialized to the first driving voltage ELVDD.

During the first initialization period Tint1, the emission control transistor ET is turned on in response to the i-th emission control signal EMi. Accordingly, during the first initialization period Tint1, the third node N3 may be initialized to the first driving voltage ELVDD.

The first initialization period Tint1 is defined as a period during which the cathode of the light emitting element ED and the first electrode (i.e., the drain) of the first transistor T1 are initialized, and may be referred to as a "cathode initialization period".

The first initialization period Tint1 may be terminated at a time point at which the (i+1)-th initialization scan signal GIi+1 is activated.

Figure 6A:
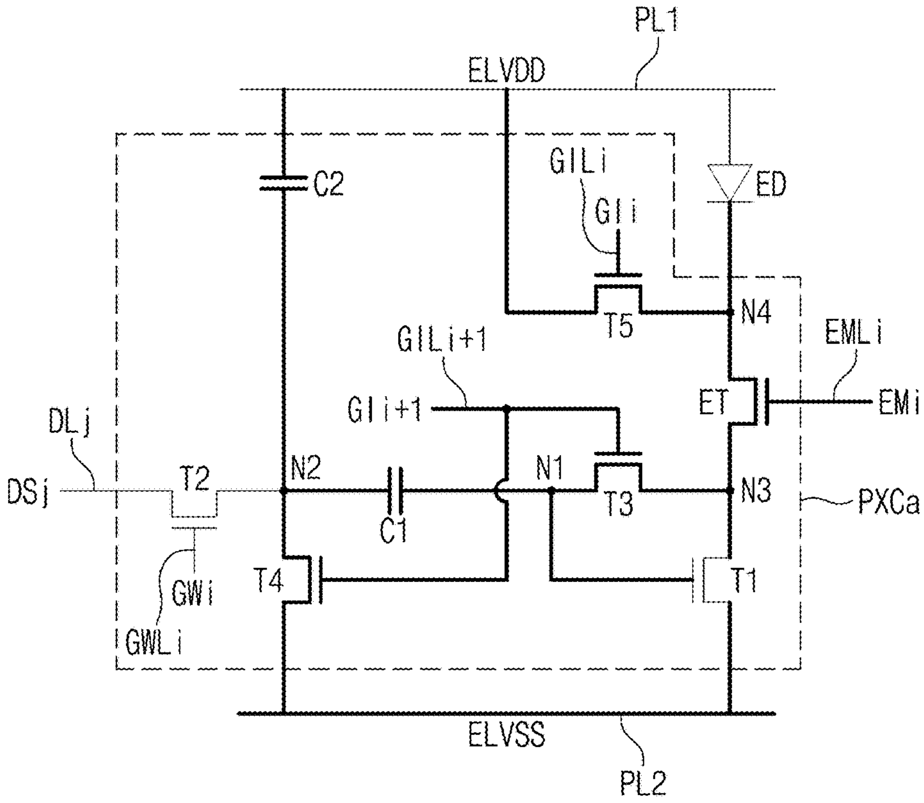
FIGS. 6A and 6B are drawings for describing an operation of a pixel during a second initialization period, according to an embodiment of the disclosure.
Figure 6B:
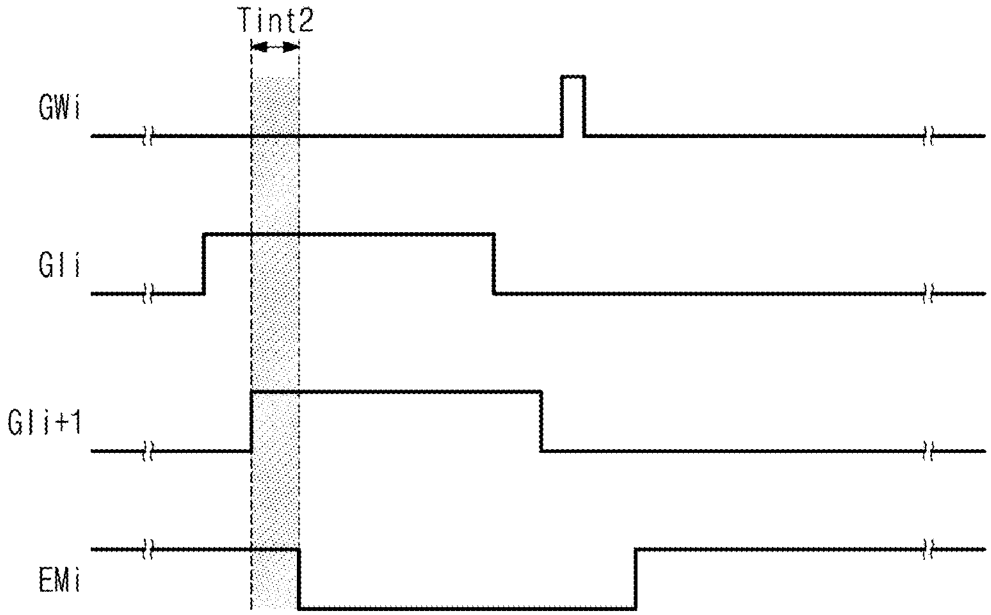

FIGS. 6A and 6B are drawings for describing an operation of the pixel PXij during a second initialization period Tint2, according to an embodiment of the disclosure.

Referring to FIGS. 6A and 6B, when the first initialization period Tint1 (see FIG. 5B) is terminated, the second initialization period Tint2 starts. That is, the second initialization period Tint2 may be subsequent to (e.g., immediately after) the first initialization period Tint1. The second initialization period Tint2 may be referred to as an initialization period.

During the second initialization period Tint2, the i-th emission control signal EMi, the i-th initialization scan signal GIi, and the (i+1)-th initialization scan signal GIi+1 may have active levels (e.g., high levels), and the i-th write scan signal GWi may have an inactive level (e.g., a low level). The second initialization period Tint2 may start at a time point at which the (i+1)-th initialization scan signal GIi+1 is activated.

During the second initialization period Tint2, the third and fourth transistors T3 and T4 are turned on in response to the (i+1)-th initialization scan signal GIi+1. Accordingly, during the second initialization period Tint2, the first driving voltage ELVDD is applied to the first node N1, and the second driving voltage ELVSS is applied to the second node N2. During the second initialization period Tint2, the first capacitor C1 may be charged with a voltage corresponding to a potential difference between the first and second nodes N1 and N2, and the second capacitor C2 may be charged with a voltage corresponding to a potential difference between the first power line PL1 and the second node N2. During the second initialization period Tint2, the first transistor T1 may be turned on or turned off.

The second initialization period Tint2 may be terminated at a time point at which the i-th emission control signal EMi is inactivated.

Figure 7A:
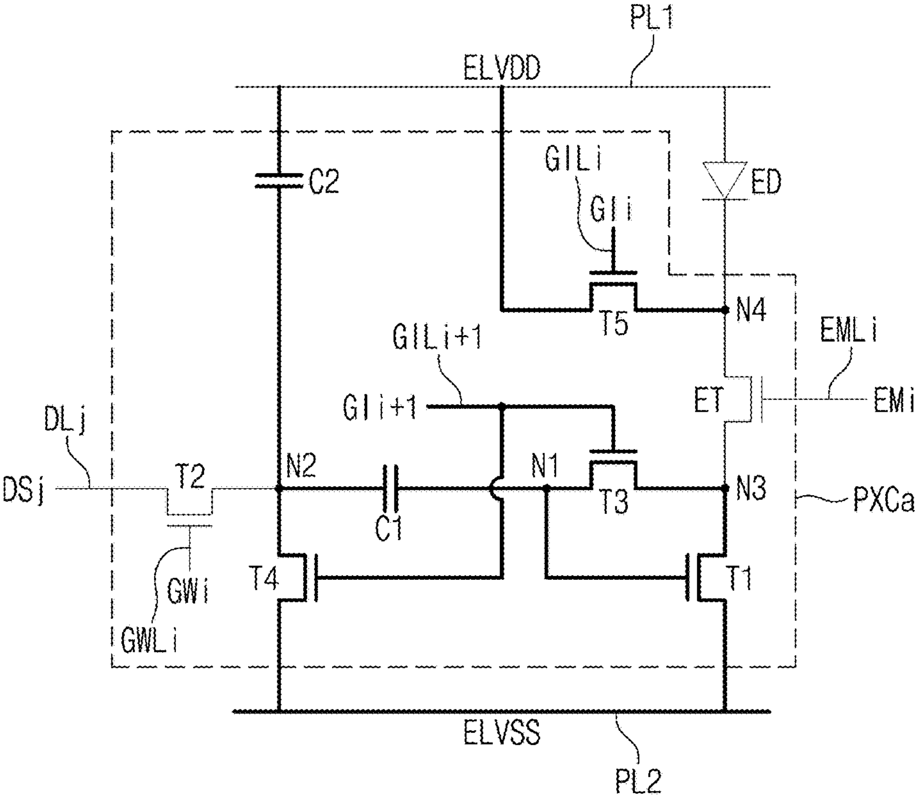
FIGS. 7A and 7B are drawings for describing an operation of a pixel during a compensation period, according to an embodiment of the disclosure.
Figure 7B:
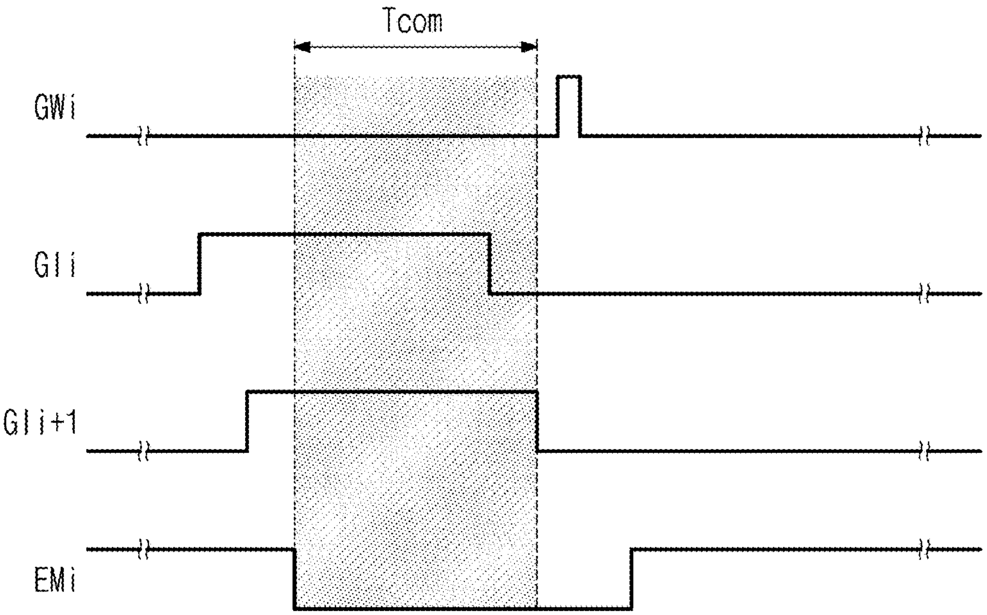

FIGS. 7A and 7B are drawings for describing an operation of the pixel PXij during a compensation period Tcom, according to an embodiment of the disclosure.

Referring to FIGS. 7A and 7B, a compensation period Tcom may be subsequent to (e.g., immediately after) the second initialization period Tint2 (see FIG. 6B).

During the compensation period Tcom, the i-th initialization scan signal GIi and the (i+1)-th initialization scan signal GIi+1 may have active levels (e.g., high levels), and the i-th write scan signal GWi and the i-th emission control signal EMi may have inactive levels (e.g., low levels). The compensation period Tcom may start at a time point at which the i-th emission control signal EMi is inactivated.

During the compensation period Tcom, the emission control transistor ET may be turned off in response to the i-th emission control signal EMi, and the third and fourth transistors T3 and T4 may be maintained to be turned on in response to the (i+1)-th initialization scan signal GIi+1. Accordingly, during the compensation period Tcom, the potential of the second node N2 is maintained at the second driving voltage ELVSS.

During the compensation period Tcom, the potential of the first node N1 may be changed to "ELVSS+Vth" by the first transistor T1 that is turned on. Here, 'Vth' denotes a threshold voltage of the first transistor T1. The compensation period Tcom may be a compensation period during which the potential of the first node N1 is compensated by the threshold voltage (Vth) of the first transistor T1.

The compensation period Tcom may end at a time point at which the (i+1)-th initialization scan signal GIi+1 is inactivated.

Figure 8A:
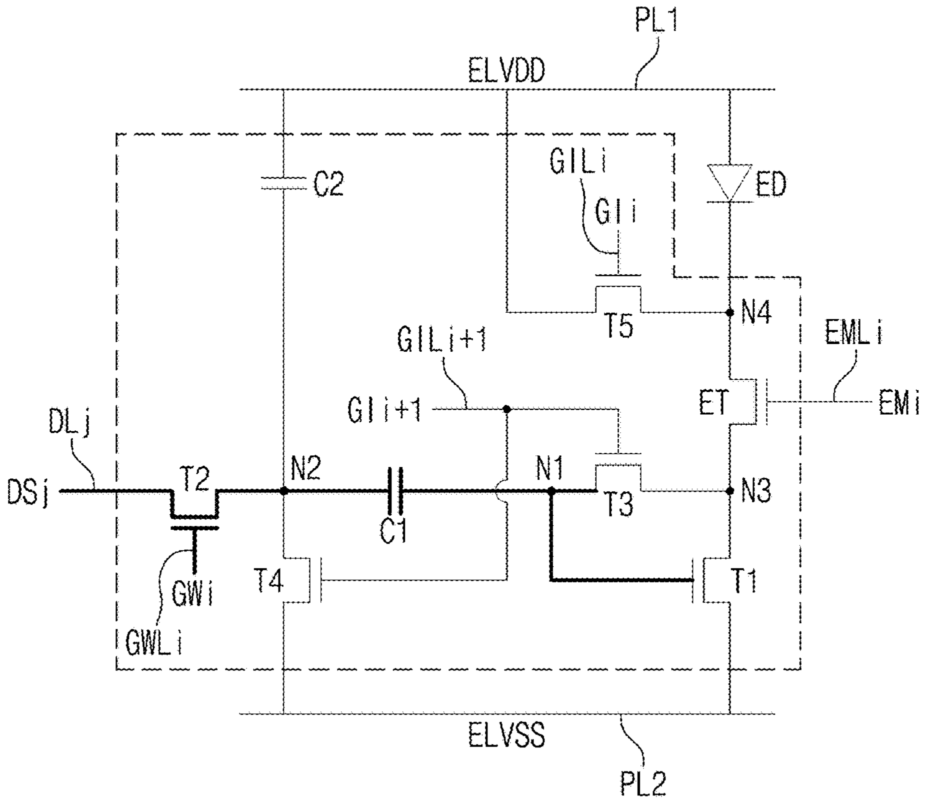
FIGS. 8A and 8B are drawings for describing an operation of a pixel during a data write period, according to an embodiment of the disclosure.
Figure 8B:
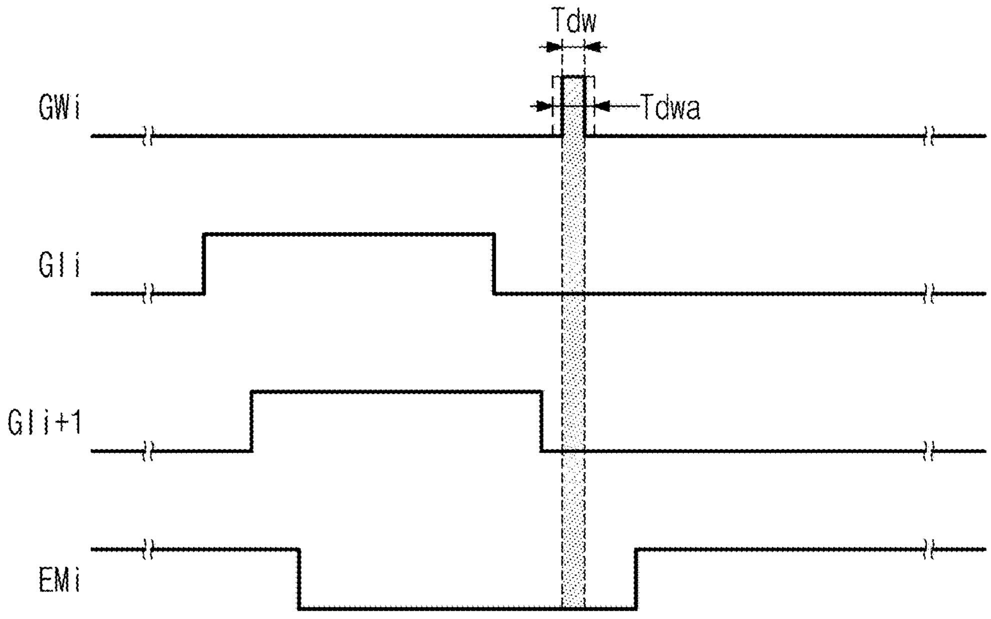

FIGS. 8A and 8B are drawings for describing an operation of a pixel during a data write period, according to an embodiment of the disclosure.

Referring to FIGS. 8A and 8B, when a compensation period Tcom (see FIG. 7B) ends, the data write period Tdw starts. In other words, the data write period Tdw may be subsequent to (e.g., immediately after) the compensation period Tcom.

FIG. 8B illustrates an embodiment where a time interval is present between the compensation period Tcom and the data write period Tdw, but the disclosure is not limited thereto. In another embodiment, for example, the data write period Tdwa may start immediately after the compensation period Tcom, and thus the time interval between the compensation period Tcom and the data write period Tdw may be omitted. The data write period Tdw may start at a time point at which the i-th write scan signal GWi is activated.

During the data write period Tdw, the i-th write scan signal GWi may have an active level (e.g., a high level), the i-th initialization scan signal GIi, the (i+1)-th initialization scan signal GIi+1, and the i-th emission control signal EMi may have an inactive level (e.g., a low level).

During the data write period Tdw, the second transistor T2 may be turned on in response to the i-th write scan signal GWi. Accordingly, during the data write period Tdw, the j-th data signal DSj may be applied to the first node N1. Accordingly, the potential of the second node N2 is converted from the second driving voltage ELVSS to the data voltage (Vdata) corresponding to the j-th data signal DSj.

When the potential of the second node N2 is converted from the second driving voltage ELVSS to the data voltage (Vdata), the potential (Vg) of the first node N1 is changed by the coupling of the first capacitor C1. In detail, the potential (Vg) of the first node N1 satisfies Equation 1 below.

$$Vg = ELVSS + Vth + \text{Vdata} - ELVSS = Vth + \text{Vdata} \quad \text{[Equation 1]}$$

The potential (Vg) of the first node N1 may include components for a data voltage (Vdata) and the threshold voltage (Vth) of the first transistor T1.

During the data write period Tdw, the (i+1)-th initialization scan signal GIi+1 and the i-th emission control signal EMi have inactive levels, and thus the third transistor T3 and the emission control transistor ET may be turned off. In other words, during the data write period Tdw, the first electrode of the first transistor T1 may be in a floating state, and thus the potential (Vg) of the first node N1 may change due to the current (i.e., leakage current) flowing through the first electrode of the first transistor T1. When the potential (Vg) of the first node N1 changes, a gate-source voltage (Vgs) of the first transistor T1 may also change. As a result, as the data write period Tdw becomes longer, the time required for the data voltage (Vdata) written to the first node N1 to be affected by the leakage current may increase. Accordingly, in an embodiment, the data write period Tdw may be set to be smaller than or equal to the horizontal scan period 1H, thereby minimizing the influence of the leakage current on the gate-source voltage (Vgs) and, as a result, accurately writing the data voltage (Vdata) to the first node N1. In an embodiment, for example, the duration of the data write period Tdwa may correspond to ½ or ⅓ of the duration of the horizontal scan period (1H). The duration of the data write period Tdwa may be equal to the duration of the horizontal scan period (1H).

The data write period Tdw may be terminated at a time point at which the i-th write scan signal GWi is inactivated.

Figure 9A:
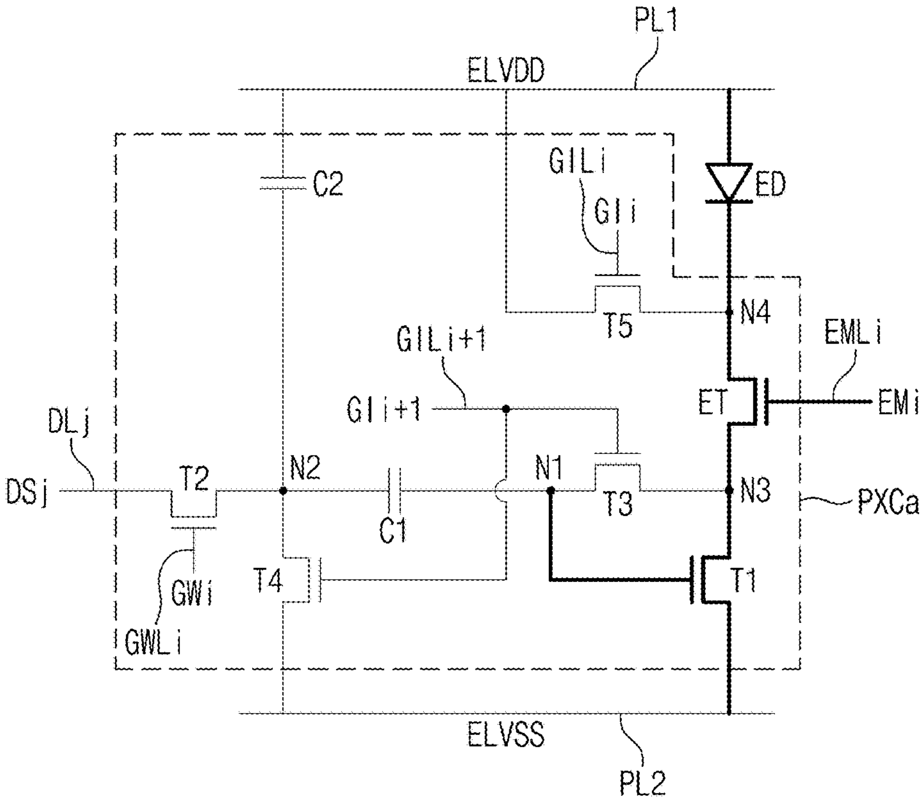
FIGS. 9A and 9B are drawings for describing an operation of a pixel during an emission period, according to an embodiment of the disclosure.
Figure 9B:
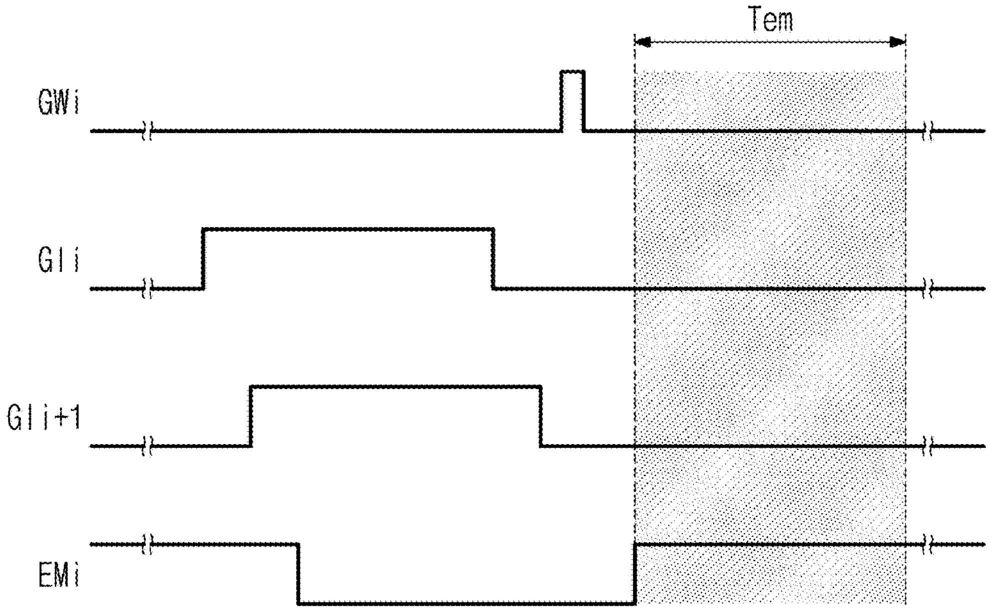

FIGS. 9A and 9B are drawings for describing an operation of a pixel during an emission period, according to an embodiment of the disclosure.

Referring to FIGS. 9A and 9B, when the data write period Tdw (see FIG. 8B) is terminated, an emission period Tem starts. In other words, the emission period Tem may be subsequent to (e.g., immediately after) the data write period Tdw.

During the emission period Tem, the i-th initialization scan signal GIi, the (i+1)-th initialization scan signal GIi+1, and the i-th write scan signal GWi may have inactive levels (e.g., low levels), and the i-th emission control signal EMi may have an active level (e.g., a high level). The emission period Tem may start at a time point at which the i-th emission control signal EMi is activated.

During the emission period Tem, the first transistor T1 may be maintained to be turned on in response to the gate-source voltage (Vgs) of the first transistor T1. Here, the gate-source voltage (Vgs) of the first transistor T1 may satisfy Equation 2 below.

$$Vgs = Vth + Vdata - ELVSS \quad \text{[Equation 2]}$$

In an embodiment, during the emission period Tem, the cathode of the light emitting element ED and the first transistor T1 may be electrically connected to each other through the emission control transistor ET turned on. Accordingly, a driving current may flow between the first power line PL1 and the second power line PL2.

According to an embodiment of the disclosure, the threshold voltage (Vth) of the first transistor T1 may not affect the current flowing through the light emitting element ED. The threshold voltage (Vth) of the first transistor T1 included in each of the pixels PX(see FIG. 1) may be different depending on characteristics of the first transistor T1. However, regardless of the characteristics of the first transistor T1 included in each of the pixels PX(see FIG. 1), the current flowing through the light emitting element ED during the subsequent emission period Tem may be constant. Accordingly, the overall display quality of the display device DD (see FIG. 1) may be improved.

Figure 10:
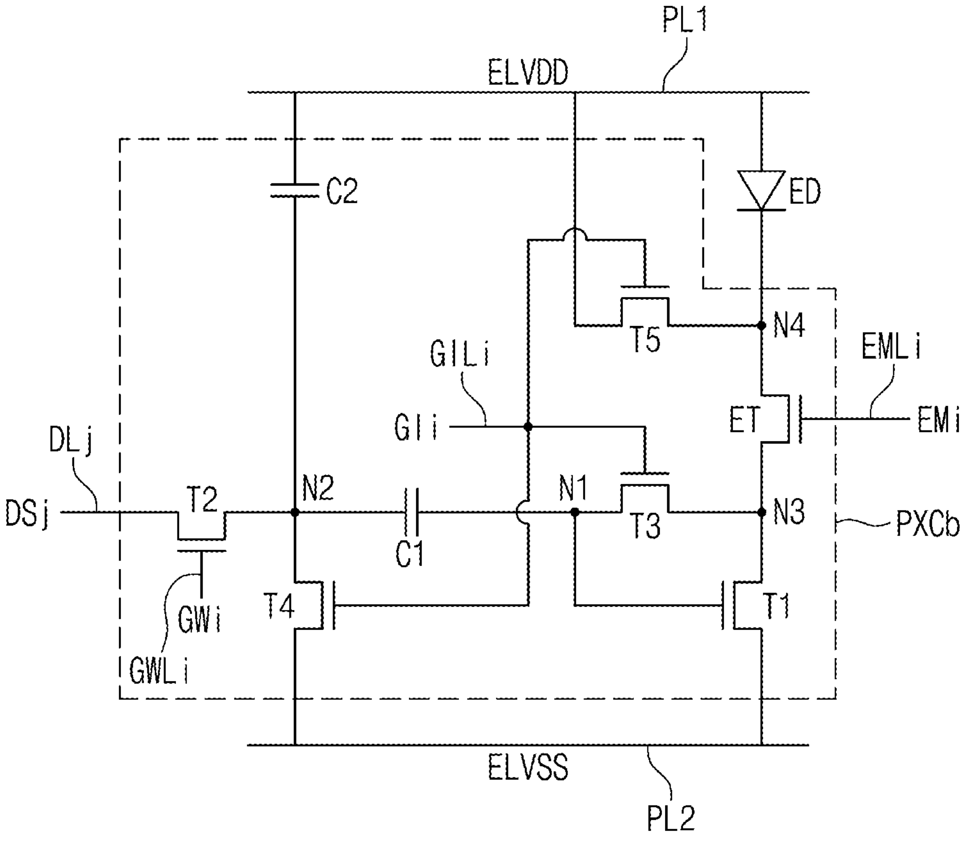
FIG. 10 is a circuit diagram of a pixel, according to an embodiment of the disclosure.
Figure 11:
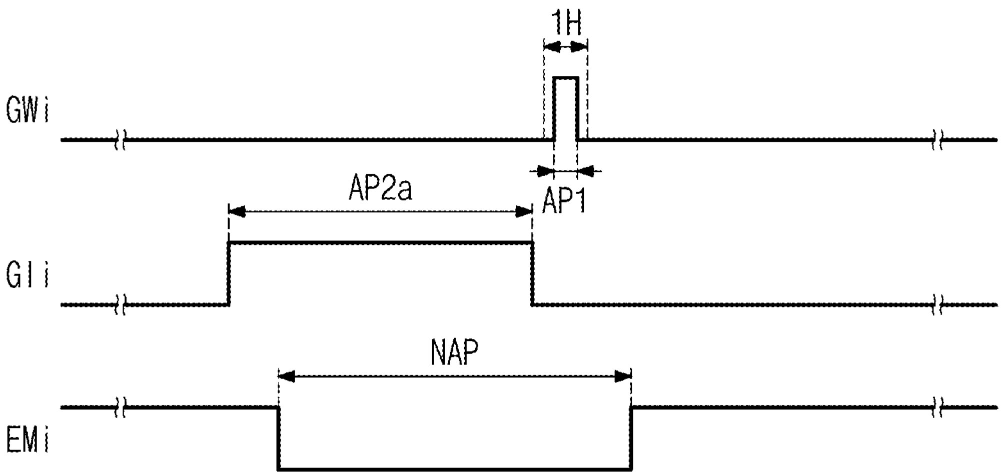
FIG. 11 is a waveform diagram illustrating signals applied to a pixel shown in FIG. 10.

FIG. 10 is a circuit diagram of a pixel, according to an embodiment of the disclosure. FIG. 11 is a waveform diagram illustrating signals applied to a pixel shown in FIG. 10. The same reference numerals are given to the same components as those shown in FIG. 3 among the components shown in FIG. 10, and thus any repetitive detailed description thereof will be omitted or simplified.

Referring to FIG. 10, an embodiment of the pixel PXij may include a pixel circuit PXCb (or a pixel driving circuit) and the light emitting element ED electrically connected to the pixel circuit PXCb. In an embodiment, as shown in FIG. 10, the pixel circuit PXCb may include six transistors (referred to as "first to fifth transistors T1 to T5 and an emission control transistor ET"), and two capacitors (referred to as "a first capacitor C1 and a second capacitor C2"), but not being limited thereto. In another embodiment of the disclosure, one of the six transistors of the pixel circuit PXCb may be omitted, or an additional transistor may be further included in the pixel circuit PXCb.

In an embodiment, the first to fifth transistors T1 to T5 and the emission control transistor ET may each be an N-type transistor having an oxide semiconductor as a semiconductor layer.

The third and fourth transistors T3 and T4 are connected to the i-th initialization scan line GILi and receives the i-th initialization scan signal GIi. The fifth transistor T5 is also connected to the i-th initialization scan line GILi and receives the i-th initialization scan signal GIi. In such an embodiment, the gate electrodes of the third to fifth transistors T3 to T5 may be commonly connected to the i-th initialization scan line GILi to receive a same scan signal.

Referring to FIG. 11, each of the i-th write scan signal GWi, the i-th initialization scan signal GIi, and the i-th emission control signal EMi may have an active level (or a high level) during some periods (i.e., an active period), and may have an inactive level (or a low level) during the remaining periods (i.e., an inactive period).

The inactive period NAP of the i-th emission control signal EMi may overlap the active period AP1 of the i-th write scan signal GWi and an active period AP2*a* of the i-th initialization scan signal GIi. In an embodiment, for example, the active period AP1 of the i-th write scan signal GWi may have duration smaller than or equal to the duration of a horizontal scan period (1H), and the active period AP2*a* of i-th initialization scan signal GIi may have duration greater than the duration of the horizontal scan period (1H).

Figure 12A:
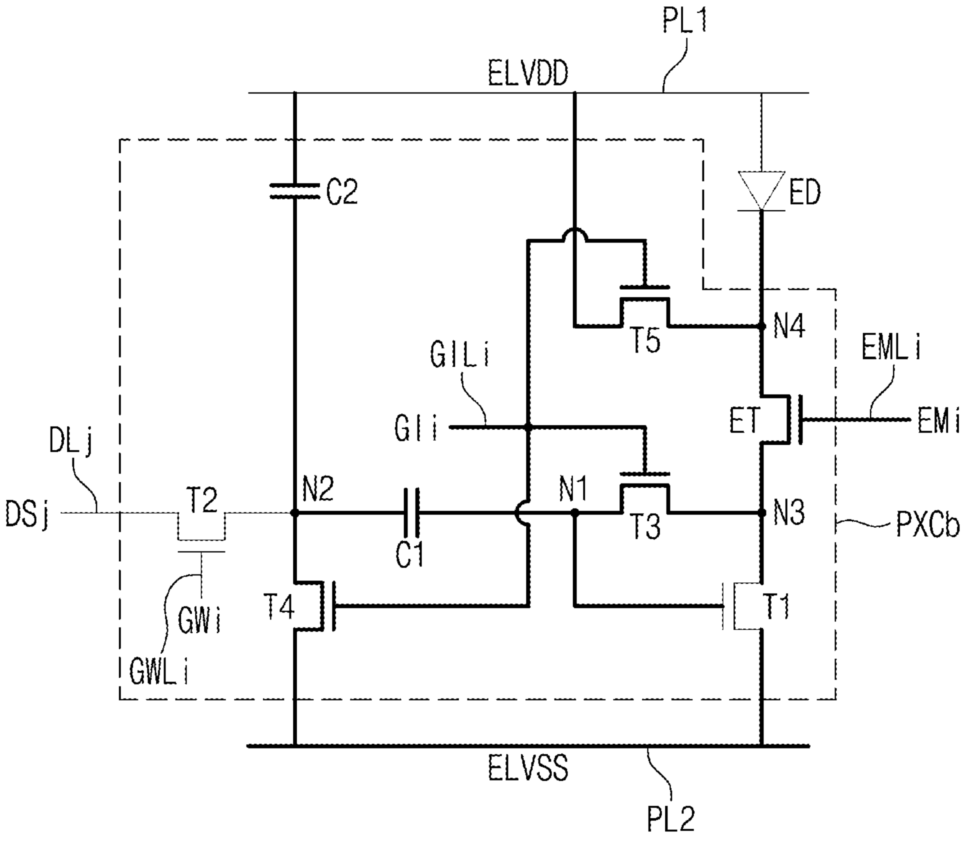
FIGS. 12A and 12B are drawings for describing an operation of a pixel during an initialization period, according to an embodiment of the disclosure.
Figure 12B:
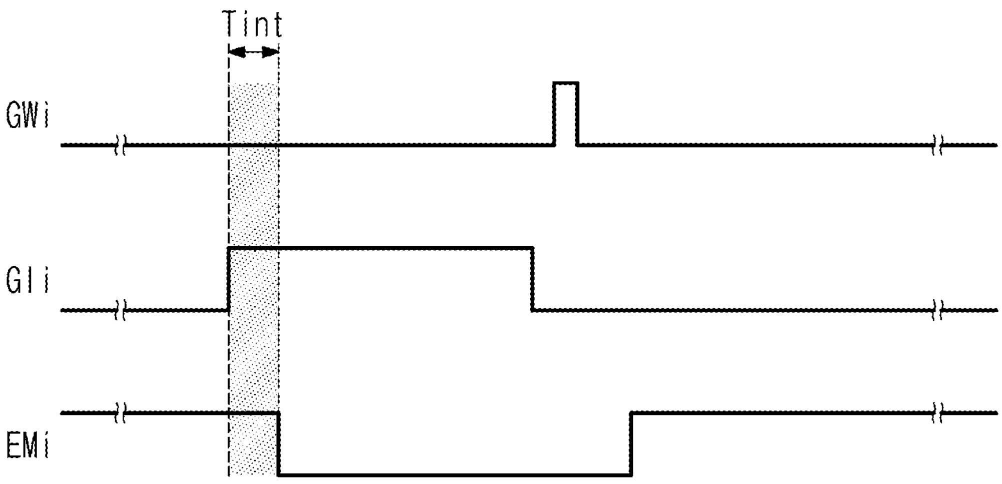

FIGS. 12A and 12B are drawings for describing an operation of the pixel PXij during an initialization period Tint, according to an embodiment of the disclosure.

Referring to FIGS. 12A and 12B, during the initialization period Tint, each of the i-th initialization scan signal GIi and the i-th emission control signal EMi may have an active level (e.g., a high level), and the i-th write scan signal GWi may have an inactive level (e.g., a low level).

During the initialization period Tint, the third to fifth transistors T3 to T5 are turned on in response to the i-th initialization scan signal GIi. Accordingly, during the initialization period Tint, the second node N2 is initialized to the second driving voltage ELVSS, and the cathode (i.e., the fourth node N4) of the light emitting element ED is initialized to the first driving voltage ELVDD.

During the initialization period Tint, the emission control transistor ET is turned on in response to the i-th emission control signal EMi. Accordingly, during the initialization period Tint, the first and third nodes N1 and N3 may be initialized with the first driving voltage ELVDD.

As the first node N1 and the second node N2 are initialized simultaneously during the initialization period Tint, the first capacitor C1 may be initialized to a difference voltage between the first driving voltage ELVDD and the second driving voltage ELVSS. The second capacitor C2 may be initialized to a difference voltage between the first driving voltage ELVDD and the second driving voltage ELVSS.

During the initialization period Tint, the first transistor T1 may be turned on or turned off.

The initialization period Tint may be terminated at a time point at which the i-th emission control signal EMi is inactivated.

Figure 13A:
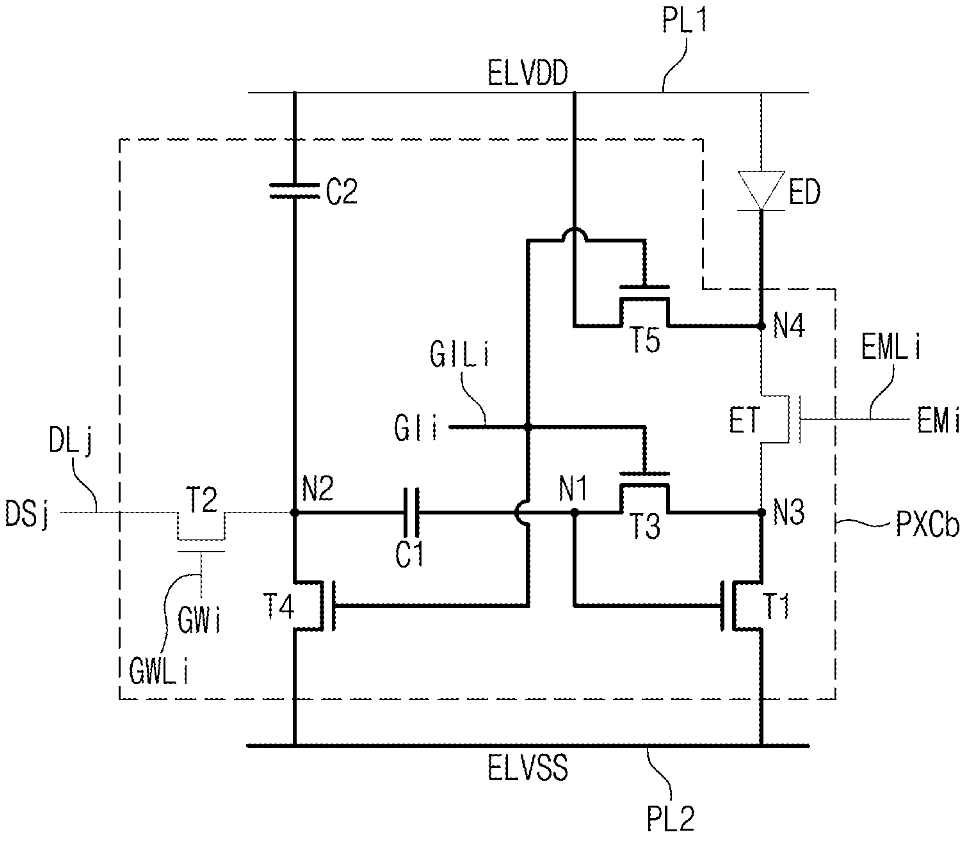
FIGS. 13A and 13B are drawings for describing an operation of a pixel during a compensation period, according to an embodiment of the disclosure.
Figure 13B:
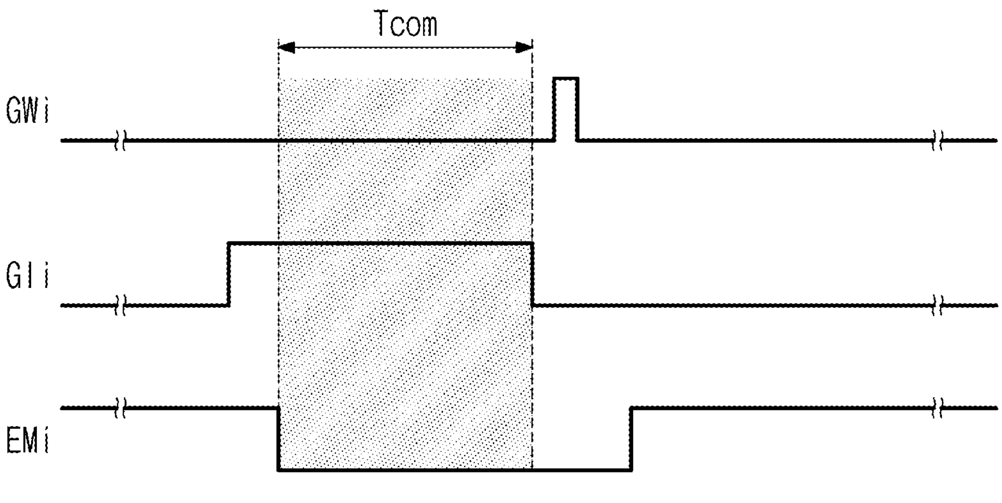

FIGS. 13A and 13B are drawings for describing an operation of a pixel during a compensation period Tcom, according to an embodiment of the disclosure.

Referring to FIGS. 13A and 13B, when the initialization period Tint (see FIG. 12B) is terminated, the compensation period Tcom starts. In other words, the compensation period Tcom lags behind the initialization period Tint.

During the compensation period Tcom, the i-th initialization scan signal GIi may have an active level (e.g., a high level), and the i-th write scan signal GWi and the i-th emission control signal EMi may have inactive levels (e.g., low levels). The compensation period Tcom may start at a time point at which the i-th emission control signal EMi is inactivated.

During the compensation period Tcom, the third to fifth transistors T3 to T5 may be turned on in response to the i-th initialization scan signal GIi. Accordingly, during the compensation period Tcom, the second driving voltage ELVSS may be applied to the second node N2, and the first driving voltage ELVDD may be applied to the cathode (i.e., the fourth node N4) of the light emitting element ED.

During the compensation period Tcom, the emission control transistor ET may be turned off in response to the i-th emission control signal EMi. Accordingly, during the compensation period Tcom, the potential of the first node N1 may be changed to "ELVSS+Vth" by the first transistor T1 turned on. Here, 'Vth' denotes a threshold voltage of the first transistor T1. The compensation period Tcom may be a compensation period during which the potential of the first node N1 is compensated by the threshold voltage Vth of the first transistor T1.

The compensation period Tcom may end at a time point at which the i-th initialization scan signal GIi is inactivated.

Figure 14:
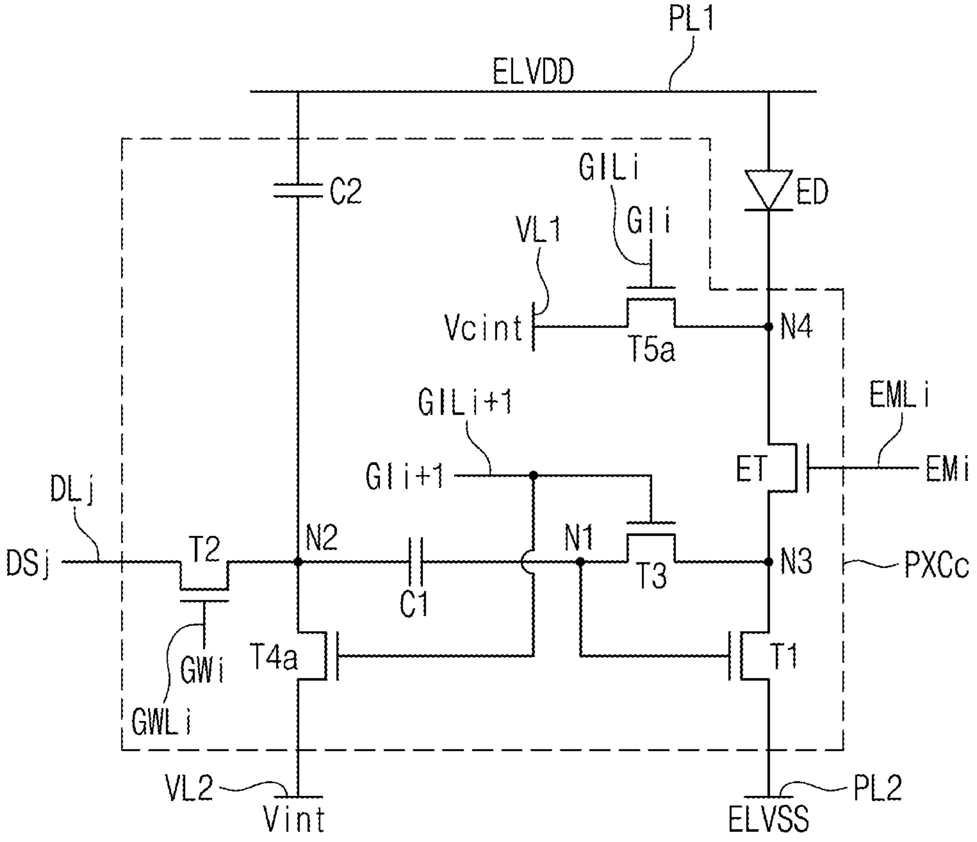
FIG. 14 is a circuit diagram of a pixel, according to an embodiment of the disclosure.

FIG. 14 is a circuit diagram of a pixel PXij, according to an embodiment of the disclosure. The same reference numerals are given to the same components as those shown in FIG. 3 among the components shown in FIG. 14, and thus any repetitive detailed description thereof will be omitted or simplified.

Referring to FIG. 14, an embodiment of the pixel PXij may include a pixel circuit PXCc (or a pixel driving circuit) and the light emitting element ED electrically connected to the pixel circuit PXCc. In an embodiment, the pixel circuit PXCc may include six transistors (referred to as "first to fifth transistors T1 to T3, T4*a*, and T5*a* and an emission control transistor ET"), and two capacitors (referred to as "a first capacitor C1 and a second capacitor C2").

In an embodiment, as shown in FIG. 14, the first to fifth transistors T1 to T3, T4*a*, and T5*a* and the emission control transistor ET may each be an N-type transistor having an oxide semiconductor as a semiconductor layer.

The fourth transistor T4*a* is connected between the second initialization voltage line VL2 and the second node N2 and receives the (i+1)-th initialization scan signal GIi+1. The fourth transistor T4*a* may include a first electrode connected to the second node N2, a second electrode connected to the second initialization voltage line VL2, and a gate electrode connected to the (i+1)-th initialization scan line GILi+1. The fourth transistor T4*a* may be turned on in response to the (i+1)-th initialization scan signal GIi+1 received through the (i+1)-th initialization scan line GILi+1 to transmit the second initialization voltage Vint applied to the second initialization voltage line VL2 to the second node N2. The second initialization voltage Vint may have a different voltage level than the second driving voltage ELVSS.

The fifth transistor T5*a* is connected between a first initialization voltage line VL1 and the cathode (i.e., the fourth node N4) of the light emitting element ED and receives the i-th initialization scan signal GIi. The fifth transistor T5*a* may include a first electrode connected to the first initialization voltage line VL1, a second electrode connected to the cathode (i.e., the fourth node N4) of the light emitting element ED, and a gate electrode connected to the i-th initialization scan line GILi. The fifth transistor T5*a* may be turned on in response to the i-th initialization scan signal GIi received through the i-th initialization scan line GILi to transmit the first initialization voltage Vcint applied to the first initialization voltage line VL1 to the cathode (i.e., the fourth node N4) of the light emitting element ED. The first initialization voltage Vcint may have a different voltage level than the first driving voltage ELVDD.

The second and fourth nodes N2 and N4 may be stably initialized to desired voltage levels by connecting independent initialization voltage lines VL1 and VL2 to the fourth and fifth transistors T4*a* and T5*a* for respectively initializing the second and fourth nodes N2 and N4.

Figure 15:
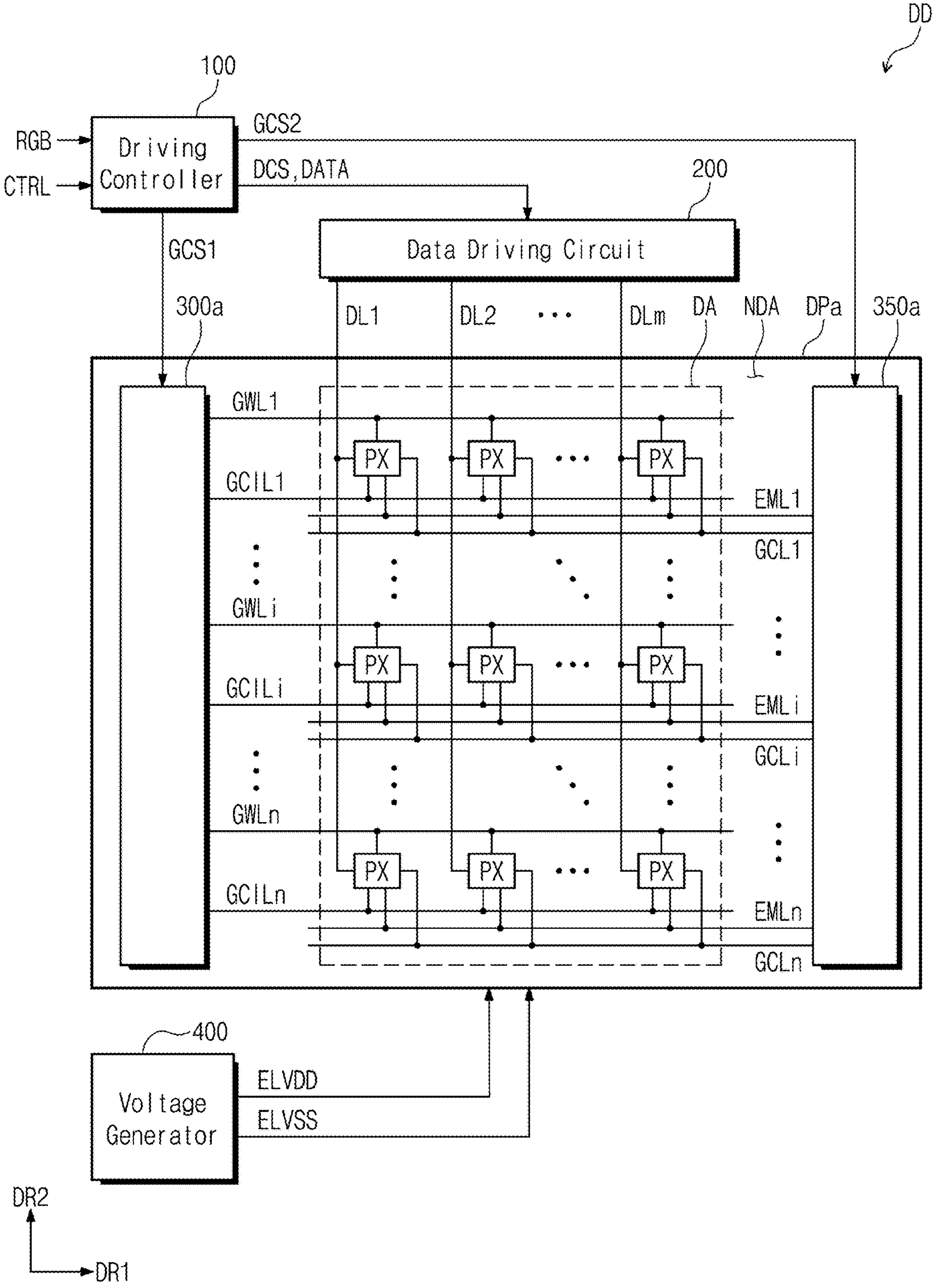
FIG. 15 is a block diagram of a display device, according to an embodiment of the disclosure.
Figure 16:
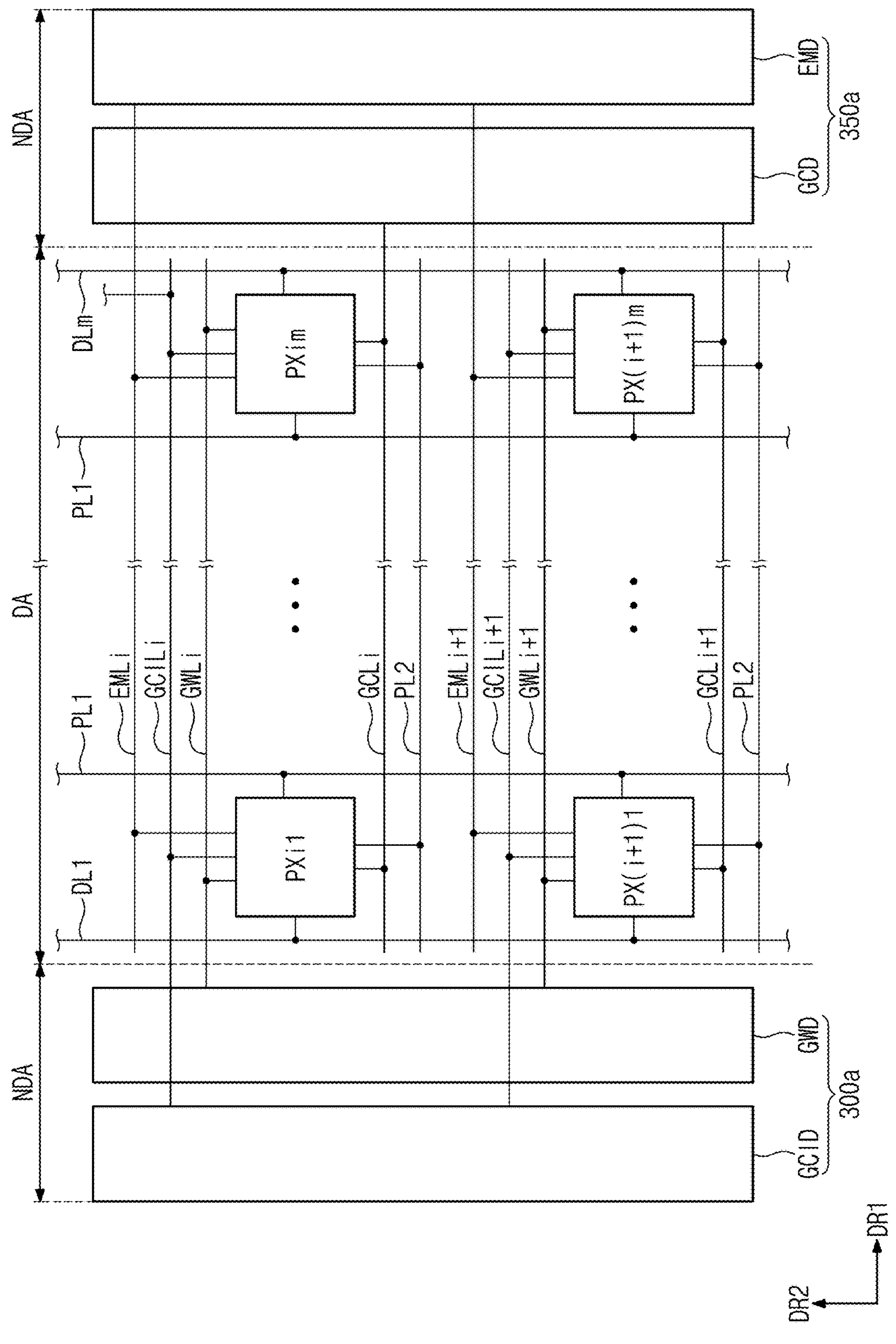
FIG. 16 is a block diagram of first and second gate driving circuits shown in FIG. 15.

FIG. 15 is a block diagram of a display device, according to an embodiment of the disclosure. FIG. 16 is a block diagram of first and second gate driving circuits shown in FIG. 15. Components, which are to the same as the components illustrated in FIGS. 1 and 2, from among components illustrated in FIGS. and 16 are marked by the same reference signs, and thus, any repetitive detailed description thereof will be omitted or simplified.

Referring to FIG. 15, an embodiment of a display panel DPa may include write scan lines GWL1 to GWLn, compensation scan lines GCL1 to GCLn, initialization scan lines GCIL1 to GCILn, and emission control lines EML1 to EMLn. The write scan lines GWL1 to GWLn may be referred to as "first scan lines", and the compensation scan lines GCL1 to GCLn may be referred to as "second scan lines". The initialization scan lines GCIL1 to GCILn may be referred to as "third scan lines".

In an embodiment, for example, a first gate driving circuit **300*a* may be connected to the write scan lines GWL1 to GWLn and the initialization scan lines GCIL1 to GCILn. The first gate driving circuit 300*a* receives the first gate control signal GCS1 from the driving controller 100. The first gate driving circuit 300*a*** may respectively output write scan signals and initialization scan signals to the write scan lines GWL1 to GWLn and the initialization scan lines GCIL1 to GCILn in response to the first gate control signal GCS1. The write scan signals may be referred to as "first scan signals", and the initialization scan signals may be referred to as "third scan signals".

In an embodiment, for example, a second gate driving circuit **350*a* may be connected to the compensation scan lines GCL1 to GCLn and the emission control lines EML1 to EMLn. The second gate driving circuit 350*a* may respectively output compensation scan signals and emission control signals to the compensation scan lines GCL1 to GCLn and the emission control lines EML1 to EMLn in response to the second gate control signal GCS2 from the driving controller 100**. The compensation scan signals may be referred to as "second scan signals".

Referring to FIG. 16, the first gate driving circuit **300*a* may include the first scan driving circuit GWD, and a third scan driving circuit GCID. The second gate driving circuit 350*a*** may include the second scan driving circuit GCD and the emission control circuit EMD. The placement (or arrangement) order of the second scan driving circuit GCD and the emission control circuit EMD in the first direction DR1 illustrated in FIG. 16 is only an example and is not particularly limited thereto.

In an embodiment, as shown in FIG. 16, the first scan driving circuit GWD is connected to the i-th write scan line GWLi and the (i+1)-th write scan line GWLi+1, and the third scan driving circuit GCID is connected to the i-th initialization scan line GCILi and the (i+1)-th initialization scan line GCILi+1. The second scan driving circuit GCD is connected to the i-th compensation scan line GCLi and the (i+1)-th compensation scan line GCLi+1. The emission control circuit EMD is connected to the i-th emission control line EMLi and the (i+1)-th emission control line EMLi+1.

FIG. 16 illustrates an embodiment having a structure in which second scan driving circuit GCD is included in the second gate driving circuit 350*a*, but the disclosure is not limited thereto. The positions of the first to third scan driving circuits GWD, GCD, and GCID may be interchanged or variously modified.

In FIG. 16, pixels PXi1, PX(i+1)1, PXim, and PX(i+1)m connected to the first data line DL1 and the m-th data line DLm are illustrated as an example. Each of the pixels PXi1, PX(i+1)1, PXim, and PX(i+1)m may be electrically connected to three scan lines, one emission control line, and one data line. In an embodiment, for example, the i-th row of pixels may be connected to the i-th write, initialization and compensation scan lines GWLi, GCILi, and GCLi and the i-th emission control line EMLi. The first column of pixels may be connected to the first data line DL1. However, an embodiment is not limited thereto. Each of the pixels PXi1, PX(i+1)1, PXim, and PX(i+1)m may be connected to scan lines of which the number is greater than three.

Figure 17A:
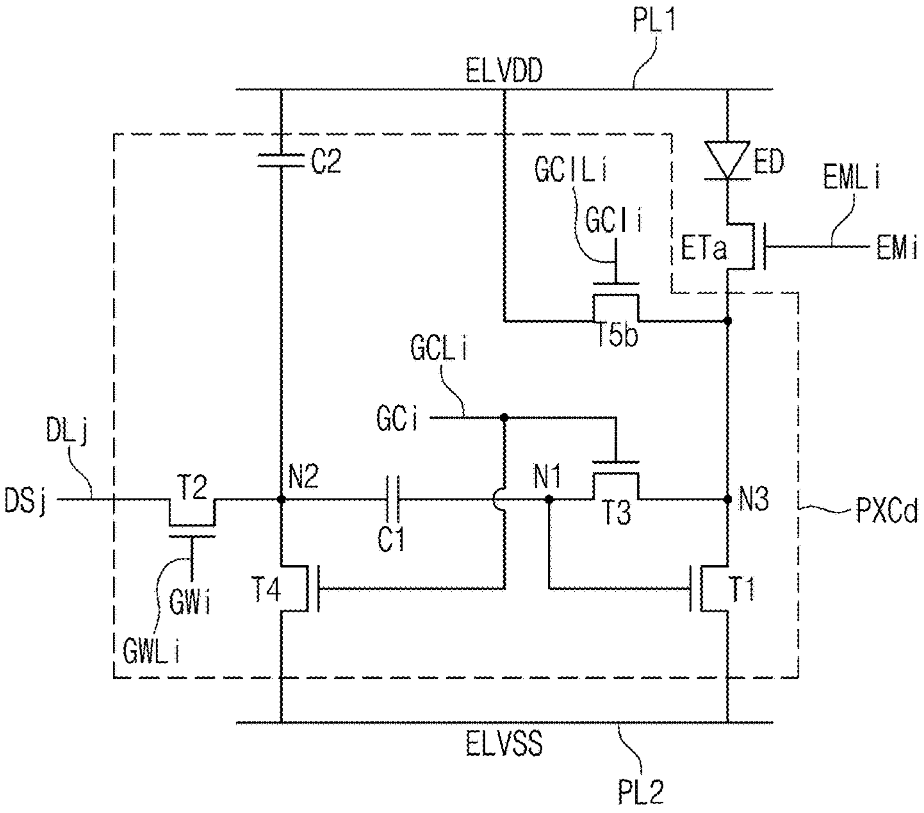
FIG. 17A is a circuit diagram of a pixel, according to an embodiment of the disclosure.
Figure 17B:
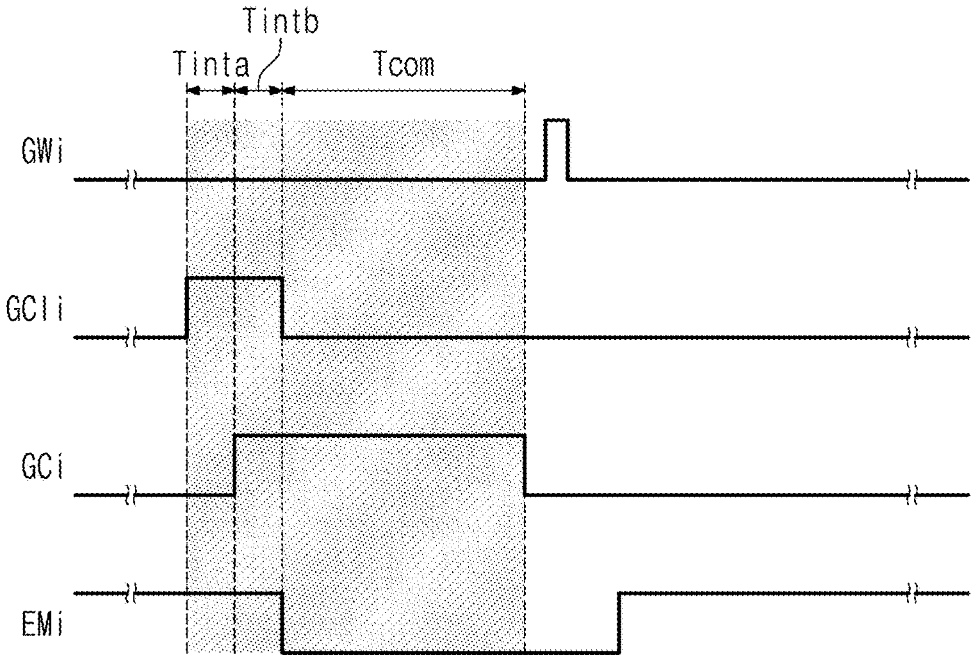
FIG. 17B is a waveform diagram showing signals applied to the pixels illustrated in FIG. 17A.

FIG. 17A is a circuit diagram of a pixel, according to an embodiment of the disclosure. FIG. 17B is a waveform diagram showing signals applied to the pixels illustrated in FIG. 17A.

FIG. 17A representatively shows an embodiment of the pixel PXij connected to the i-th write scan line GWLi among the write scan lines GWL1 to GWLn (see FIG. 15) and the j-th data line DLj among the plurality of data lines DL1 to DLm (see FIG. 15). The pixel PXij is connected to the i-th compensation scan line GCLi among the compensation scan lines GCL1 to GCLn (see FIG. 15) and to the i-th initialization scan line GCILi among the initialization scan lines GCIL1 to GCILn (see FIG. 15). The pixel PXij is connected to the i-th emission control line EMLi among the emission control lines EML1 to EMLn (see FIG. 15).

The pixel PXij may include the pixel circuit PXCd (or a pixel driving circuit) and the light emitting element ED electrically connected to the pixel circuit PXCd. In an embodiment, as shown in FIG. 17A, the pixel circuit PXCd may include six transistors (referred to as "first to fifth transistors T1 to T4 and T5*b* and an emission control transistor ETa"), and two capacitors (referred to as "a first capacitor C1 and a second capacitor C2"), but not being limited thereto. In another embodiment of the disclosure, one of the six transistors of the pixel circuit PXCd may be omitted, or an additional transistor may be further included in the pixel circuit PXCd.

The i-th write scan line GWLi may transmit the i-th write scan signal GWi to the pixel PXij. The i-th compensation scan line GCLi may deliver the i-th compensation scan signal GCi to the pixel PXij. The i-th initialization scan line GCILi may transmit the i-th initialization scan signal GCIi (as described above, also referred to as a "third scan signal") to the pixel PXij. The i-th emission control line EMLi may transmit the i-th emission control signal EMi to the pixel PXij. The j-th data line DLj may transmit the j-th data signal DSj to the pixel PXij.

In an embodiment, as shown in FIG. 17A, the first to fifth transistors T1 to T4 and T5*b* and the emission control transistor ETa may each be an N-type transistor having an oxide semiconductor as a semiconductor layer.

The fifth transistor T5*b* is connected between the first power line PL1 and the third node N3 and receives the i-th initialization scan signal GCIi. The fifth transistor T5*b* may include a first electrode connected to the first power line PL1, a second electrode connected to the third node N3, and a gate electrode connected to the i-th initialization scan line GCILi. The fifth transistor T5*b* may be turned on in response to the i-th initialization scan signal GCIi received through the i-th initialization scan line GCILi to transmit the first driving voltage ELVDD to the third node N3. Alternatively, the fifth transistor T5*b* may be connected between the first initialization voltage line VL1 (see FIG. 14) and the third node N3. In such an embodiment, the fifth transistor T5*b* is turned on in response to the i-th initialization scan signal GCIi to transmit the first initialization voltage Vcint (see FIG. 14) to the third node N3.

The emission control transistor ETa may be connected between the light emitting element ED and the first transistor T1 and receive the i-th emission control signal EMi. The emission control transistor ETa may include a first electrode connected to the cathode of the light emitting element ED, a second electrode connected to the third node N3, and a gate electrode connected to the i-th emission control line EMLi. The emission control transistor ETa may be turned on in response to the i-th emission control signal EMi received through the i-th emission control line EMLi to electrically connect the cathode of the light emitting element ED and the third node N3. The third node N3 may be defined as a node to which the first electrode of the first transistor T1, the second electrode of the fifth transistor T5*b*, the second electrode of the emission control transistor ETa, and the second electrode of the third transistor T3 are connected.

Referring to FIG. 17B, each of the i-th write scan signal GWi, the i-th compensation scan signal GCi, the i-th initialization scan signal GCIi, and the i-th emission control signal EMi may have an active level (or a high level) during some periods (i.e., an active period), and may have an inactive level (or a low level) during the remaining periods (i.e., an inactive period).

During a first initialization period Tinta, the i-th initialization scan signal GCIi and the i-th emission control signal EMi may have active levels (e.g., high levels), and the i-th write scan signal GWi and the i-th compensation scan signal GCi may have inactive levels (e.g., low levels).

During the first initialization period Tinta, the fifth transistor T5*b* is turned on in response to the i-th initialization scan signal GCIi. Accordingly, during the first initialization period Tinta, the third node N3 is initialized to the first driving voltage ELVDD.

During the first initialization period Tinta, the emission control transistor ETa is turned on in response to the i-th emission control signal EMi. Accordingly, during the first initialization period Tinta, the cathode of the light emitting element ED may be initialized to the first driving voltage ELVDD by the emission control transistor ETa turned on.

The first initialization period Tinta is defined as a period during which the cathode of the light emitting element ED and the first electrode (i.e., drain) of the first transistor T1 are initialized, and may be referred to as a "cathode initialization period".

The first initialization period Tinta may be terminated at a time point at which the i-th compensation scan signal GCi is activated.

A second initialization period Tintb may be subsequent to (e.g., immediately after) the first initialization period Tinta. The second initialization period Tintb may be referred to as an "initialization period".

During the second initialization period Tintb, the i-th emission control signal EMi, the i-th initialization scan signal GCIi, and the i-th compensation scan signal GCi may have active levels (e.g., high levels), and the i-th write scan signal GWi may have an inactive level (e.g., a low level). The second initialization period Tintb may start at a time point at which the i-th compensation scan signal GCi is activated.

During the second initialization period Tintb, the third and fourth transistors T3 and T4 are turned on in response to the i-th compensation scan signal GCi. Accordingly, during the second initialization period Tintb, the first driving voltage ELVDD is applied to the first node N1, and the second driving voltage ELVSS is applied to the second node N2. During the second initialization period Tintb, the first capacitor C1 may be charged with a voltage corresponding to a potential difference between the first and second nodes N1 and N2, and the second capacitor C2 may be charged with a voltage corresponding to a potential difference between the first power line PL1 and the second node N2.

The second initialization period Tintb may be terminated at a time point at which the i-th emission control signal EMi is inactivated.

During the compensation period Tcom, the i-th compensation scan signal GCi may have an active level (e.g., a high level), and the i-th initialization scan signal GCIi, the i-th write scan signal GWi, and the i-th emission control signal EMi may have inactive levels (e.g., low levels). The compensation period Tcom may start at a time point at which the i-th initialization scan signal GCIi and the i-th emission control signal EMi are inactive.

During the compensation period Tcom, the third and fourth transistors T3 and T4 may be maintained to be turned on in response to the i-th compensation scan signal GCi. Accordingly, during the compensation period Tcom, the potential of the second node N2 is maintained at the second driving voltage ELVSS.

In such an embodiment, during the compensation period Tcom, the potential of the first node N1 may be changed to "ELVSS+Vth" by the first transistor T1 turned on. Here, 'Vth' may be a threshold voltage of the first transistor T1. The compensation period Tcom may be a compensation period during which the potential of the first node N1 is compensated by the threshold voltage (Vth) of the first transistor T1.

The compensation period Tcom may be terminated at a time point at which the i-th compensation scan signal GCi is inactivated.

An operation in the data write period Tdw and the emission period Tem is the same as the operation described in FIGS. 8A to 9B, and thus any repetitive detailed descriptions will be omitted.

Figure 18:
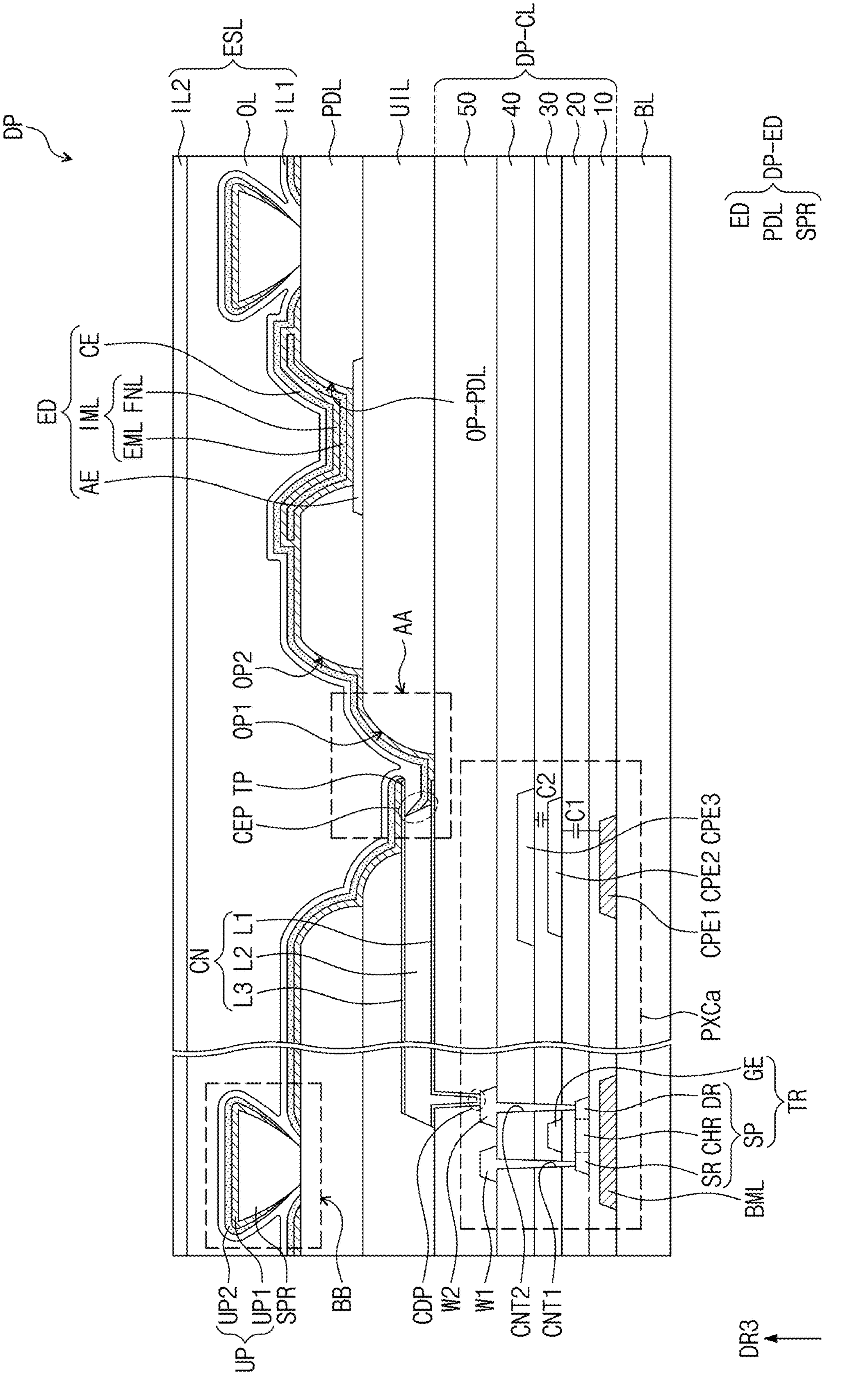
FIG. 18 is a cross-sectional view of a display panel, according to an embodiment of the disclosure.
Figure 19A:
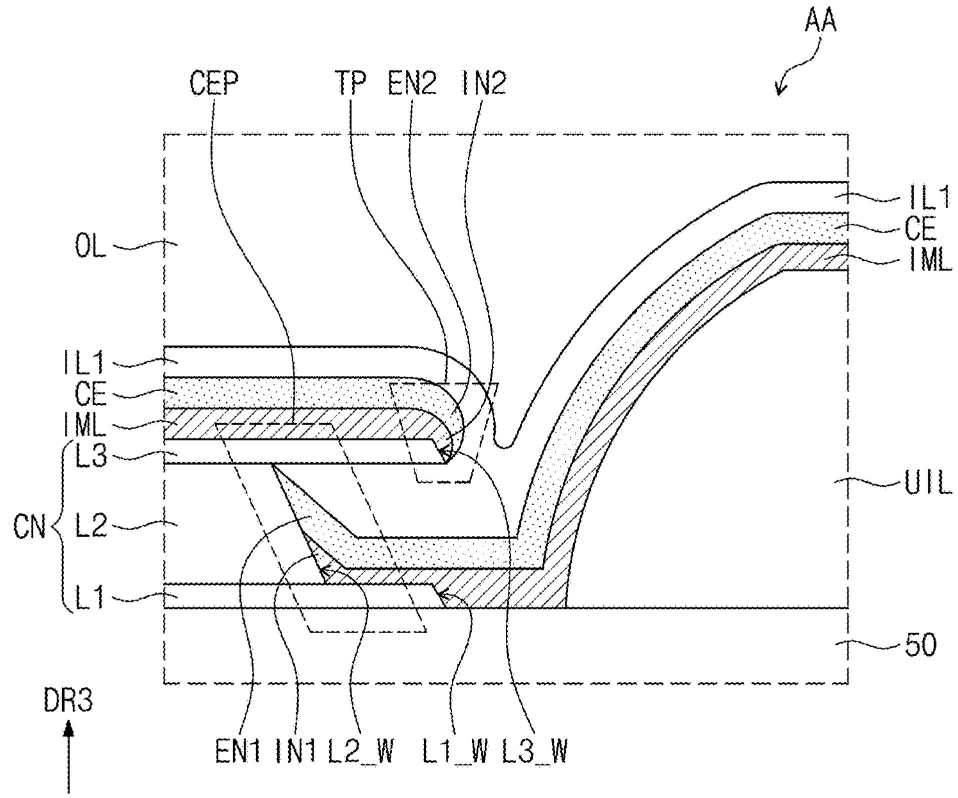
FIG. 19A is an enlarged cross-sectional view of a display panel, which is obtained by enlarging region AA of FIG. 18, according to an embodiment of the disclosure.
Figure 19B:
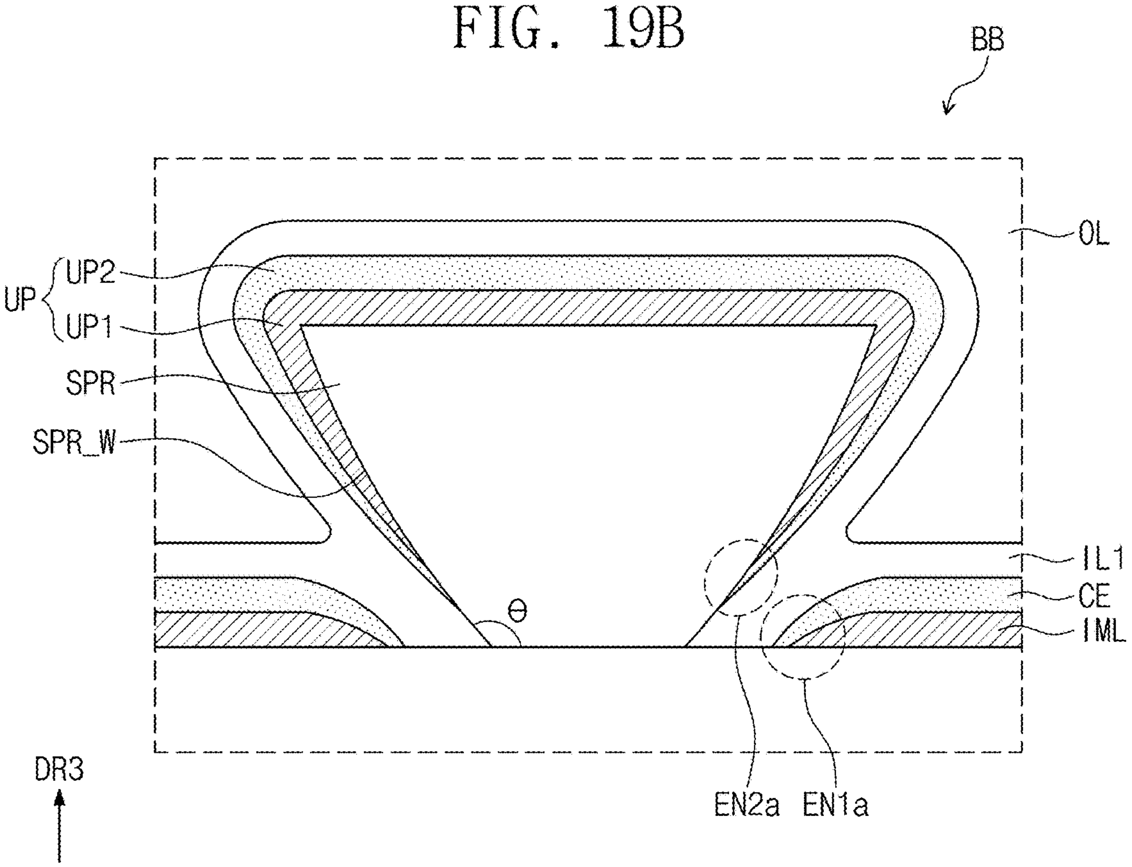
FIG. 19B is an enlarged cross-sectional view of a display panel, which is obtained by enlarging region BB of FIG. 18, according to an embodiment of the disclosure.

FIG. 18 is a cross-sectional view of the display panel DP, according to an embodiment of the disclosure. FIG. 19A is an enlarged cross-sectional view of a display panel, which is obtained by enlarging region AA of FIG. 18, according to an embodiment of the disclosure. FIG. 19B is an enlarged cross-sectional view of a display panel, which is obtained by enlarging region BB of FIG. 18, according to an embodiment of the disclosure.

Referring to FIG. 18, an embodiment of the display panel DP may include a base layer BL, and a circuit element layer DP-CL, an upper insulating layer UIL, a connection wire CN, a display element layer DP-ED, and an encapsulation layer ESL that are disposed on the base layer BL. In an embodiment, the encapsulation layer ESL may include a first inorganic encapsulation layer IL1, an organic encapsulation layer OL, and an second inorganic encapsulation layer IL2.

FIG. 18 illustrates one transistor TR and two capacitors C1 and C2 of the pixel circuit PXCa for convenience of illustration. The transistor TR may correspond to a transistor (i.e., a transistor connected to a node (e.g., the fourth node N4 of FIG. 3) corresponding to a cathode CE of the light emitting element ED) connected to the light emitting element ED through the connection wire CN. In detail, the transistor TR may correspond to the emission control transistor ET or the fifth transistor T5 of FIG. 3. Although not illustrated, other transistors constituting the pixel circuit PXCa may have a same structure as the transistor TR (hereinafter, referred to as a "connection transistor") illustrated in FIG. 18. However, this is illustrative, and the other transistors constituting the pixel circuit PXCa may have a structure different from that of the connection transistor TR and are not limited to an embodiment.

A lower conductive layer BML may be disposed to overlap the connection transistor TR and may be covered by a first insulating layer 10. At least one of an inorganic barrier layer or a buffer layer may be further disposed between the lower conductive layer BML and the base layer BL.

In an embodiment, the lower conductive layer BML may be connected to a source of the connection transistor TR through a source electrode pattern W1. In such an embodiment, the lower conductive layer BML may be synchronized with the source of the connection transistor TR. However, this is illustrative, and in another embodiment, the lower conductive layer BML may be connected to a gate of the connection transistor TR and may be synchronized with the gate. Alternatively, the lower conductive layer BML may be connected to another electrode and may independently receive a constant voltage or a pulse signal. Alternatively, the lower conductive layer BML may be provided in a form (e.g., an island form) isolated from another conductive pattern. The lower conductive layer BML according to an embodiment of the disclosure may be provided in various forms and is not limited to an embodiment.

The connection transistor TR may be disposed on the first insulating layer 10. The connection transistor TR may include a semiconductor pattern SP and a gate electrode GE. The semiconductor pattern SP may be disposed on the first insulating layer 10. The semiconductor pattern SP may include a source region SR, a drain region DR, and a channel region CHR distinguished (defined differently) from one another depending on the degree of conductivity.

The display panel DP according to an embodiment may further include the source electrode pattern W1 and a drain electrode pattern W2 that are connected to the source region SR and the drain region DR, respectively. In an embodiment, each of the source electrode pattern W1 and the drain electrode pattern W2 may be integrally formed with one of lines constituting a pixel driver and is not limited to an embodiment.

A second insulating layer 20 may commonly overlap a plurality of pixels and may cover the semiconductor pattern SP. The gate electrode GE may be disposed on the second insulating layer 20. The gate electrode GE may correspond to the gate of the connection transistor TR.

A third insulating layer 30 may be disposed on the gate electrode GE, and a fourth insulating layer 40 may be disposed on the third insulating layer 30. A first capacitor electrode CPE1, a second capacitor electrode CPE2, and a third capacitor electrode CPE3 may be included in a plurality of conductive patterns.

The first capacitor electrode CPE1 and the second capacitor electrode CPE2 constitute the first capacitor C1. The first capacitor electrode CPE1 and the second capacitor electrode CPE2 may be spaced apart from each other with the first insulating layer 10 and the second insulating layer 20 therebetween.

In an embodiment of the disclosure, the first capacitor electrode CPE1 and the lower conductive layer BML may have a one-body shape or be integrally formed with each other as a single unitary indivisible part. In addition, the second capacitor electrode CPE2 and the gate electrode GE may have a one-body shape.

The third capacitor electrode CPE3 may be disposed on the third insulating layer 30. The third capacitor electrode CPE3 may be spaced apart from the second capacitor electrode CPE2 with the third insulating layer 30 therebetween and may overlap the second capacitor electrode CPE2 when viewed in a plan view or in a third direction DR3. Here, the third direction DR3 may be a thickness direction of the base layer BL. The third capacitor electrode CPE3, together with the second capacitor electrode CPE2, may constitute the second capacitor C2.

The fourth insulating layer 40 may be disposed on the third insulating layer 30 and/or the third capacitor electrode CPE3. The source electrode pattern W1 and the drain electrode pattern W2 may be disposed on the fourth insulating layer 40. The source electrode pattern W1 may be connected to the source region SR of the connection transistor TR through a first contact hole CNT1, and the source electrode pattern W1 and the source region SR of the semiconductor pattern SP may function as the source of the connection transistor TR. The drain electrode pattern W2 may be connected to the drain region DR of the connection transistor TR through a second contact hole CNT2, and the drain electrode pattern W2 and the drain region DR of the semiconductor pattern SP may function as the drain of the connection transistor TR. A fifth insulating layer 50 may be disposed on the source electrode pattern W1 and the drain electrode pattern W2.

The connection wire CN may be disposed on the fifth insulating layer 50. The connection wire CN may electrically connect the pixel circuit PXCa and the light emitting element ED. In an embodiment, the connection wire CN may electrically connect the connection transistor TR and the light emitting element ED to each other. The connection wire CN may be a connection node that connects the pixel circuit PXCa and the light emitting element ED. That is, the connection wire CN may correspond to the fourth node N4 illustrated in FIG. 3. However, this is illustrative, and as long as the connection wire CN is capable of being connected to the light emitting element ED, the connection wire CN may be defined as a connection node with various elements among elements constituting the pixel circuit PXCa depending on the design of the pixel circuit PXCa and is not limited to an embodiment.

The upper insulating layer UIL may be disposed on the connection wire CN. The upper insulating layer UIL may be disposed on the fifth insulating layer 50 and may cover the connection wire CN. The upper insulating layer UIL may be an organic layer. In an embodiment, for example, the upper insulating layer UIL may include a general purpose polymer, such as benzocyclobutene (BCB), polyimide, hexamethyldisiloxane (HMDSO), polymethylmethacrylate (PMMA), or polystyrene (PS), a polymer derivative having a phenolic group, an acryl-based polymer, an imide-based polymer, an aryl ether-based polymer, an amide-based polymer, a fluorine-based polymer, a p-xylene-based polymer, a vynyl alcohol-based polymer, or a blend thereof.

The upper insulating layer UIL may define an opening for exposing at least part of the connection wire CN. The connection wire CN may be electrically connected with the light emitting element ED through the portion exposed from the upper insulating layer UIL. That is, the connection wire CN may electrically connect the connection transistor TR and the light emitting element ED. Detailed description thereabout will be given below. In the display panel DP according to an embodiment of the disclosure, the upper insulating layer UIL may be omitted, or a plurality of upper insulating layers UIL may be provided. However, the disclosure is not limited to an embodiment.

The display element layer DP-ED may be disposed on the upper insulating layer UIL. The display element layer DP-ED may include a pixel defining layer PDL, the light emitting element ED, and a separator SPR. The light emitting element ED may include an anode AE, an intermediate layer IML, and the cathode CE.

In an embodiment, the anode AE may be disposed on the upper insulating layer UIL. The anode AE may be a transflective electrode, a transmissive electrode, or a reflective electrode. According to an embodiment of the disclosure, the anode AE may include a reflective layer including or formed of silver (Ag), magnesium (Mg), aluminum (Al), platinum (Pt), palladium (Pd), gold (Au), nickel (Ni), neodymium (Nd), iridium (Ir), chromium (Cr), or a compound thereof and a transparent or translucent electrode layer disposed or formed on the reflective layer. The transparent or translucent electrode layer may include at least one selected from indium tin oxide (ITO), indium zinc oxide (IZO), indium gallium zinc oxide (IGZO), zinc oxide (ZnO), or indium oxide ($In_2O_3$) and aluminum-doped zinc oxide (AZO). In an embodiment, for example, the anode AE may include a stacked structure of ITO/Ag/ITO. The anode AE may be connected to the first power line PL1 (see FIG. 3) to receive the first driving voltage ELVDD (see FIG. 3).

A light emitting opening OP-PDL for exposing at least part of the anode AE may be defined in the pixel defining layer PDL. A plurality of light emitting openings OP-PDL may be provided. The plurality of light emitting openings OP-PDL may be disposed to correspond to light emitting elements, respectively. All components of the light emitting element ED may be disposed in the light emitting opening OP-PDL to overlap one another, and the light emitting opening OP-PDL may be a region where light emitted by the light emitting element ED is substantially displayed.

The intermediate layer IML may be interposed between the anode AE and the cathode CE. The intermediate layer IML may include a light emitting layer EML and a functional layer FNL. The light emitting element ED may include the intermediate layer IML having various structures and is not limited to an embodiment. In an embodiment, for example, the functional layer FNL may include a plurality of layers, or may include two or more layers spaced apart from each other with the light emitting layer EML therebetween. Alternatively, in an embodiment, the functional layer FNL may be omitted. Although FIG. 18 illustrates an embodiment in which the light emitting layer EML and the functional layer FNL have different shapes from each other, the disclosure is not limited thereto, and the light emitting layer EML and the functional layer FNL may be disposed in the same shape when viewed from above the plane.

The functional layer FNL may be interposed between the anode AE and the cathode CE. In detail, the functional layer FNL may be interposed between the anode AE and the light emitting layer EML, or may be interposed between the cathode CE and the light emitting layer EML. Alternatively, the functional layer FNL may be interposed between the anode AE and the light emitting layer EML and between the cathode CE and the light emitting layer EML. In an embodiment, the light emitting layer EML may be inserted into the functional layer FNL. However, this is illustrative, and the functional layer FNL may include a layer interposed between the light emitting layer EML and the anode AE and/or a layer interposed between the light emitting layer EML and the cathode CE and is not limited to an embodiment. The functional layer FNL may include a hole control layer and an electron control layer. At least part of the hole control layer may be interposed between the anode AE and the light emitting layer EML, and at least part of the electron control layer may be interposed between the light emitting layer EML and the cathode CE.

The cathode CE may be disposed on the intermediate layer IML. In an embodiment, as described above, the cathode CE may be connected to the connection wire CN and may be electrically connected to the pixel circuit PXCa. That is, the cathode CE may be electrically connected to the connection transistor TR through the connection wire CN.

In an embodiment, as described above, the connection wire CN may include a driving connection unit CDP and a light emitting connection unit CEP. The driving connection unit CDP may be a part of the connection wire CN connected to the pixel circuit PXCa and may be a part substantially connected to the connection transistor TR. In an embodiment, the driving connection unit CDP may penetrate the fifth insulating layer 50 and may be electrically connected to the drain region DR of the semiconductor pattern SP through the drain electrode pattern W2. The light emitting connection unit CEP may be a part of the connection wire CN connected to the light emitting element ED. The light emitting connection unit CEP may be a part, which is defined in a region exposed from the upper insulating layer UIL and to which the cathode CE is connected. A tip portion TP may be defined in the light emitting connection unit CEP.

The light emitting connection unit CEP of the connection wire CN will be described below in greater detail with reference to FIGS. 18 and 19A. In an embodiment, as illustrated in FIGS. 18 and 19A, the connection wire CN may have a three-layer structure. In an embodiment, for example, the connection wire CN may include a first layer L1, a second layer L2, and a third layer L3 sequentially stacked in the third direction DR3. The second layer L2 may include a material different from that of the first layer L1. In an embodiment, the second layer L2 may include a material different from that of the third layer L3. The second layer L2 may have a greater thickness than the first layer L1. In an embodiment, the second layer L2 may have a greater thickness than the third layer L3. The second layer L2 may include a highly conductive material. In an embodiment, the second layer L2 may include aluminum (Al).

In an embodiment, the first layer L1 may include a material having a lower etch rate than the second layer L2. In other words, the second layer L2 may include or be formed of materials having a high etch selectivity with respect to the first layer L1. In an embodiment, the first layer L1 may include titanium (Ti), and the second layer L2 may include aluminum (Al). In such an embodiment, a side surface L1_W of the first layer L1 may be defined outward from a side surface (also referred to as a second side surface) L2_W of the second layer L2. That is, the light emitting connection unit CEP of the connection wire CN may have a shape in which the side surface L1_W of the first layer L1 protrudes outward from the side surface L2_W of the second layer L2. That is, the light emitting connection unit CEP of the connection wire CN may have a shape in which the side surface L2_W of the second layer L2 is recessed inward from the side surface L1_W of the first layer L1.

In an embodiment, the third layer L3 may include a material having a lower etch rate than the second layer L2. That is, the third layer L3 and the second layer L2 may include or be formed of materials with high etch selectivity. In an embodiment, the third layer L3 may include titanium (Ti), and the second layer L2 may include aluminum (Al). In such an embodiment, a side surface L3_W of the third layer L3 may be defined outward from the side surface L2_W of the second layer L2. That is, the light emitting connection unit CEP of the connection wire CN may have a shape in which the side surface L3_W of the third layer L3 protrudes outward from the side surface L2_W of the second layer L2. That is, the light emitting connection unit CEP of the connection wire CN may have an undercut shape or an overhang structure, and the tip portion TP of the light emitting connection unit CEP may be defined by the portion of the third layer L3 that protrudes relative to the second layer L2.

The upper insulating layer UIL and the pixel defining layer PDL may expose at least part of the tip portion TP and at least part of the second side surface L2_W. In an embodiment, a first opening OP1 for exposing one side of the connection wire CN may be defined in the upper insulating layer UIL, and a second opening OP2 overlapping the first opening OP1 may be defined in the pixel defining layer PDL. The planar area of the second opening OP2 may be greater than the planar area of the first opening OP1. However, the disclosure is not limited thereto, and as long as at least part of the tip portion TP and at least part of the second side surface L2_W are capable of being exposed, the planar area of the second opening OP2 may be smaller than or equal to the planar area of the first opening OP1.

The intermediate layer IML may be disposed on the pixel defining layer PDL. The intermediate layer IML may also be disposed on a partial region of the upper insulating layer UIL exposed by the second opening OP2 of the pixel defining layer PDL. In an embodiment, the intermediate layer IML may also be disposed on a partial region of the connection wire CN exposed by the first opening OP1 of the upper insulating layer UIL. In an embodiment, as illustrated in FIG. 19A, the intermediate layer IML may include one end IN1 disposed along the upper surface of the fifth insulating layer 50 and an opposite end IN2 disposed along the upper surfaces of the connection wire CN and the tip portion TP. That is, when viewed on the cross-section, the intermediate layer IML may have a shape that is partially disconnected with respect to the tip portion TP in the region where the light emitting connection unit CEP is defined. However, when viewed from above the plane, the intermediate layer IML may have a one-body shape that is connected as a whole within a region (see FIG. 21A) defined as a closed line by the separator SPR.

The cathode CE may be disposed on the intermediate layer IML. The cathode CE may also be disposed on a partial region of the upper insulating layer UIL exposed by the second opening OP2 of the pixel defining layer PDL. Furthermore, the cathode CE may also be disposed on a partial region of the connection wire CN exposed by the first opening OP1 of the upper insulating layer UIL. In an embodiment, as illustrated in FIG. 19A, the cathode CE may include one end EN1 disposed along the upper surface of the fifth insulating layer 50 and an opposite end EN2 disposed along the upper surfaces of the connection wire CN and the tip portion TP. That is, when viewed on the cross-section, the cathode CE may have a shape that is partially disconnected with respect to the tip portion TP in the region where the light emitting connection unit CEP is defined. However, when viewed in a plan view or in the third direction DR3, the cathode CE may have a one-body shape that is connected as a whole within the region (see FIG. 21A) defined as a closed curve by the separator SPR.

In the meantime, the one end EN1 of the cathode CE may be disposed along the side surface L2_W of the second layer L2 and may make contact with the side surface L2_W of the second layer L2. In detail, through a difference in deposition angle between the cathode CE and the intermediate layer IML, the cathode CE may be formed to make contact with the side surface L2_W of the second layer L2 exposed from the intermediate layer IML by the tip portion TP. That is, the cathode CE may be connected to the connection wire CN without a separate patterning process for the intermediate layer IML, and thus the light emitting element ED may be electrically connected to the pixel circuit PXCa through the connection wire CN.

In an embodiment, as shown in FIG. 19A, the opposite end IN2 of the intermediate layer IML and the opposite end EN2 of the cathode CE may cover the side surface L3_W of the third layer L3, this is illustrative, and at least part of the side surface L3_W of the third layer L3 may be exposed from the opposite end IN2 of the intermediate layer IML and/or the opposite end EN2 of the cathode CE.

The display panel DP according to an embodiment may include the separator SPR. The separator SPR may be disposed on the pixel defining layer PDL. In an embodiment, the cathode CE and the intermediate layer IML may be commonly formed for the plurality of pixels by deposition through an open mask. In such an embodiment, the cathode CE and the intermediate layer IML may be divided by the separator SPR. In an embodiment, as described above, the separator SPR may have a closed-line shape for each of light emitting parts, and thus the cathode CE and the intermediate layer IML may have a divided shape for each light emitting part. That is, the cathode CE and the intermediate layer IML may be electrically independent of each adjacent pixel.

The separator SPR will be described below in greater detail with reference to FIGS. 18 and 19B. In an embodiment, as illustrated in FIG. 19B, the separator SPR may have an inverted tapered shape. That is, an angle θ (hereinafter, referred to as a "taper angle") formed by a side surface SPR_W of the separator SPR with respect to the upper surface of the pixel defining layer PDL may be an obtuse angle. However, this is illustrative, and the taper angle may be diversely set as long as the separator SPR is capable of electrically disconnecting the cathode CE for each pixel. In addition, the separator SPR may have the same structure as the tip portion TP and is not limited to an embodiment.

In an embodiment, the separator SPR may include an insulating material. In an embodiment, for example, the separator SPR may include an organic insulating material. Alternatively, the separator SPR may include an inorganic insulating material. In another embodiment, the separator SPR may be composed of or defined by multiple layers of an organic insulating material and an inorganic insulating material. In an embodiment, the separator SPR may include a conductive material. That is, the type of material of the separator SPR is not particularly limited as long as the cathode CE is capable of being electrically disconnected for each pixel.

A dummy layer UP may be disposed on the separator SPR. The dummy layer UP may include a first dummy layer UP1 disposed on the separator SPR and a second dummy layer UP2 disposed on the first dummy layer UP1. The first dummy layer UP1 may be formed through a same process as that of the intermediate layer IML and may include a same material as the intermediate layer IML. The second dummy layer UP2 may be formed through a same process as that of the cathode CE and may include a same material as the cathode CE. That is, the first dummy layer UP1 and the second dummy layer UP2 may be simultaneously formed in a process of forming the intermediate layer IML and the cathode CE. In an embodiment, the display panel DP may not include the dummy layer UP.

As illustrated in FIG. 19B, in an embodiment, the cathode CE may include a first end portion EN1*a*, and the second dummy layer UP2 may include a second end portion EN2*a*. The first end portion EN1*a* may be spaced apart from the separator SPR and may be located on the pixel defining layer PDL, and the second end portion EN2*a* may be separated from the first end portion EN1*a* and may be located on the side surface SPR_W of the separator SPR. However, although the first end portion EN1*a* is illustrated as being spaced apart from the side surface SPR_W of the separator SPR at a certain interval in FIG. 19B, the disclosure is not limited thereto, and the first end portion EN1*a* may make contact with the side surface SPR_W of the separator SPR as long as the first end portion EN1*a* is electrically disconnected from the second end portion EN2*a*. Moreover, when a portion formed along the side surface SPR_W of the separator SPR is thin such that electrical resistance is high even though the first end portion EN1*a* and the second end portion EN2*a* are connected without being distinguished from each other, the cathode CE may be considered as being divided by the separator SPR when the cathode CE is electrically disconnected between adjacent pixels.

According to an embodiment of the disclosure, even though there is no separate patterning process for the cathode CE or the intermediate layer IML, the cathode CE or the intermediate layer IML may be divided for each pixel by effectively preventing the cathode CE or the intermediate layer IML from being formed on the side surface SPR_W of the separator SPR or by making the cathode CE or the intermediate layer IML thin. In addition, as long as the cathode CE or the intermediate layer IML is capable of being electrically disconnected between adjacent pixels, the shape of the separator SPR may be modified in various ways and is not limited to an embodiment.

Figure 20:
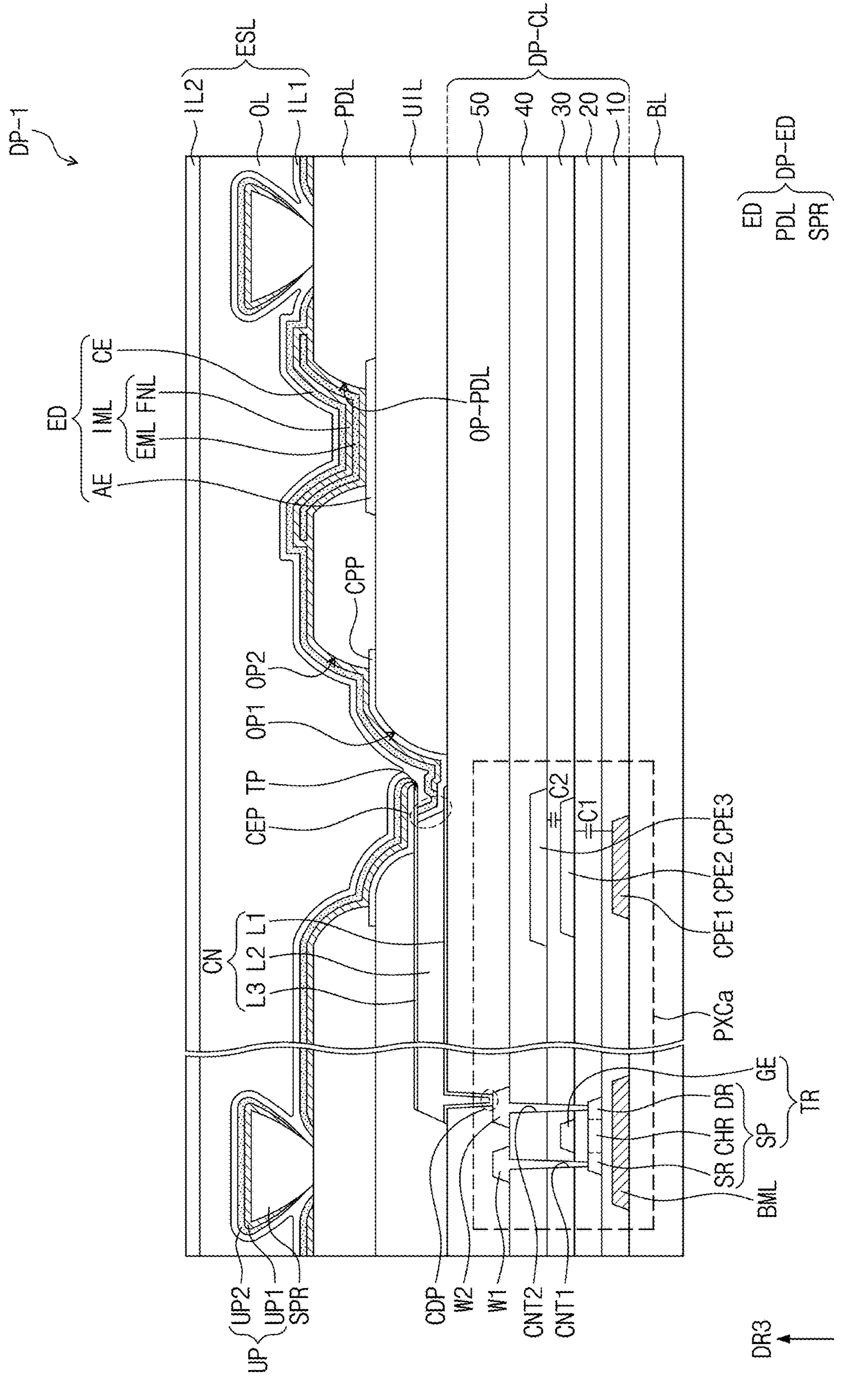
FIG. 20 is a sectional view of a display panel, according to an embodiment of the disclosure.

FIG. 20 is a cross-sectional view of a display panel, according to an embodiment of the disclosure. For convenience of description, a cross-sectional view of a region corresponding to FIG. 18 is illustrated in FIG. 20. Hereinafter, the same or like components as the components described above with reference to FIG. 18 will be assigned with the same or like reference numerals, and any repetitive detailed descriptions thereof will be omitted or simplified.

In an embodiment, as shown in FIG. 20, a display panel DP-1 may further include a capping pattern CPP. The capping pattern CPP may be disposed on the upper insulating layer UIL. In such an embodiment, the capping pattern CPP may also be disposed on a partial region of the connection wire CN exposed by the first opening OP1 of the upper insulating layer UIL. The capping pattern CPP may be disposed to overlap the connection wire CN. Specifically, the capping pattern CPP may be disposed to overlap the light emitting connection unit CEP and/or the tip portion TP.

In an embodiment, when viewed on the cross-section illustrated in FIG. 20, the capping pattern CPP may have a shape that is partially disconnected with respect to the tip portion TP in the region where the light emitting connection unit CEP is defined. However, when viewed from above the plane, the capping pattern CPP may have a one-body shape that is connected as a whole within the region (see FIG. 21A) defined as a closed line by the separator SPR. In such an embodiment, one end portion of the partially disconnected capping pattern CPP may make contact with a side surface of the second layer L2 of the connection wire CN, and another end portion of the capping pattern CPP may be disposed on the third layer L3 of the connection wire CN and may cover the tip portion TP.

The capping pattern CPP may include a conductive material. Accordingly, the cathode CE may be electrically connected to the connection wire CN through the capping pattern CPP. That is, the capping pattern CPP may make contact with the side surface of the second layer L2 of the connection wire CN. In such an embodiment, the cathode CE may make contact with the capping pattern CPP and may be electrically connected to the connection wire CN. The capping pattern CPP may be disposed outward from the second layer L2 of the connection wire CN, and the cathode CE may be electrically connected with the second layer L2 only by making a connection with the capping pattern CPP instead of the side surface of the second layer L2. Accordingly, the connection between the connection wire CN and the cathode CE may be easily performed.

In an embodiment, the capping pattern CPP may include a material having a lower reactivity than the second layer L2 of the connection wire CN. In an embodiment, for example, the capping pattern CPP may include copper (Cu), silver (Ag), or transparent conductive oxide. The side surface of the second layer L2 of the connection wire CN may be protected by the capping pattern CPP having a lower reactivity than the second layer L2 of the connection wire CN, and thus oxidation of the material included in the second layer L2 may be effectively prevented. In such an embodiment, a phenomenon that a silver (Ag) component included in the anode AE is reduced during an etching process of patterning the anode AE and remains as particles that cause defects may be prevented.

In an embodiment, the capping pattern CPP may be formed through a same process as that of the anode AE and may include a same material as the anode AE. However, this is illustrative, and the capping pattern CPP may be formed through a process different from that of the anode AE and may include a material different from that of the anode AE. The disclosure is not limited to an embodiment.

Figure 21A:
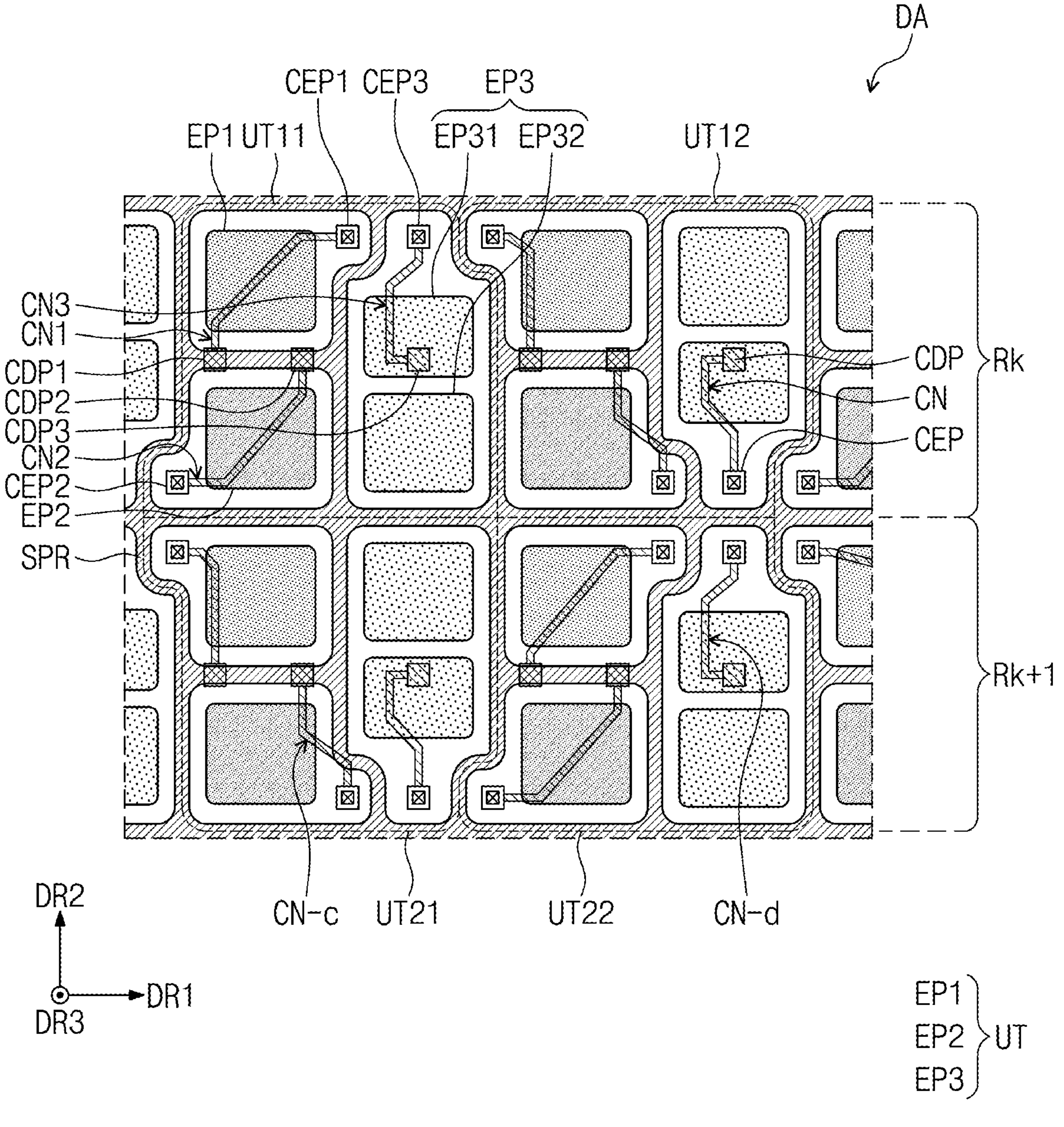
FIGS. 21A to 21C are enlarged plan views of partial regions of a display panel, according to an embodiment of the disclosure.
Figure 21B:
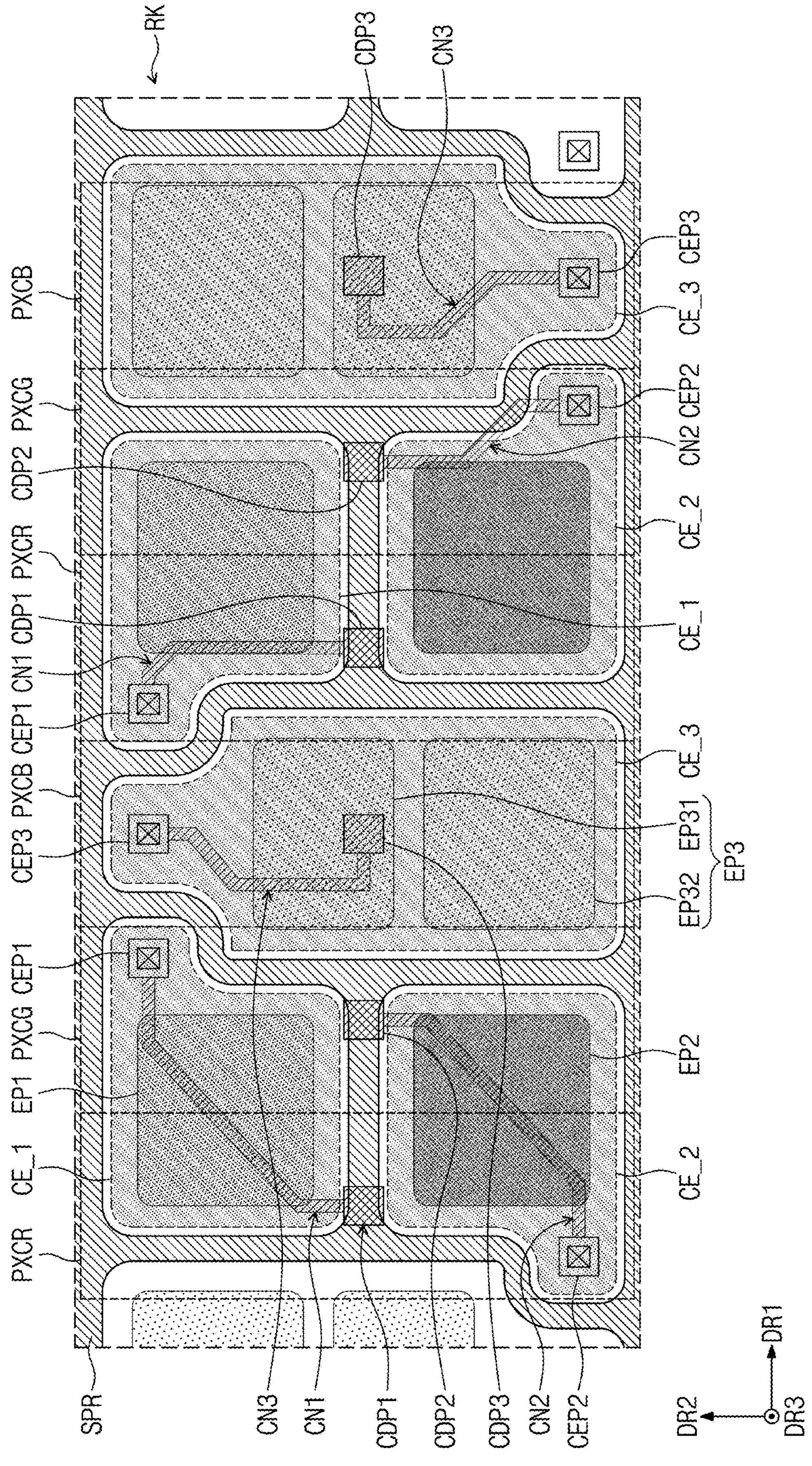
Figure 21C:
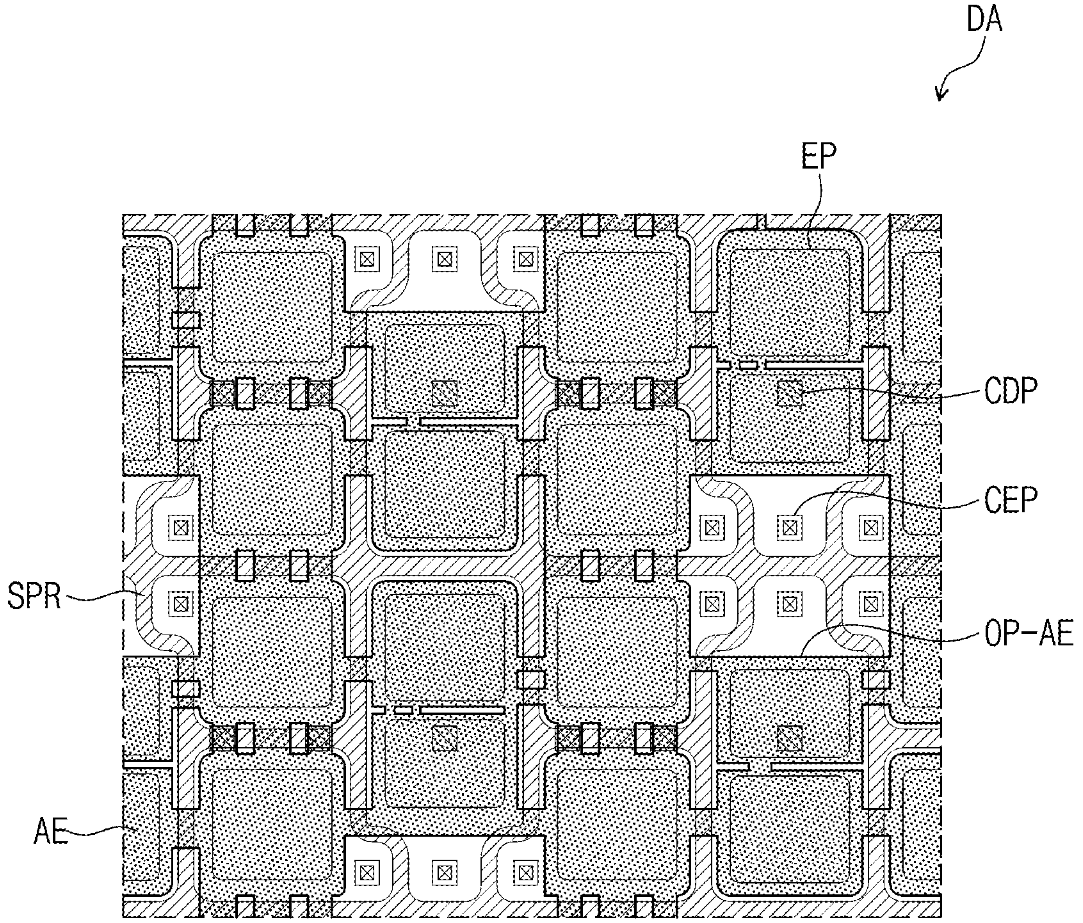

FIGS. 21A to 21C are enlarged plan views of partial regions of a display panel, according to an embodiment of the disclosure. FIGS. 21A to 21C may correspond to enlarged plan views of the display panels DP and DP-1 according to an embodiment described above with reference to FIGS. 18 to 20. FIG. 21A illustrates a region where a total of four light emitting units are arranged in two rows and two columns, and FIG. 21B illustrates an enlarged view of a partial region illustrated in FIG. 21A. In FIG. 21C, some of the components illustrated in FIG. 21A are omitted or emphasized. Hereinafter, a display panel according to an embodiment of the disclosure will be described with reference to FIGS. 21A to 21C.

In FIG. 21A, light emitting units UT11, UT12, UT21, and UT22 arranged in two rows and two columns are illustrated. Light emitting parts in a first row Rk include light emitting parts that constitute the light emitting unit UT11 in the first row and the first column and the light emitting unit UT12 in the first row and the second column. Light emitting parts in a second row Rk+1 include light emitting parts that constitute the light emitting unit UT21 in the second row and the first column and the light emitting unit UT22 in the second row and the second column. In FIG. 21B, the light emitting parts in the first row Rk are illustrated. Among the components of the display panel, the separator SPR and a plurality of light emitting parts EP1, EP2, and EP3, connection wires CN1, CN2, and CN3, the anode AE, and the cathode CE, which are disposed in regions partitioned by the separator SPR are illustrated in FIGS. 21A to 21C.

In an embodiment, as described above, each of the light emitting parts EP1, EP2, and EP3 may correspond to the light emitting opening OP-PDL (see FIG. 18). That is, each of the light emitting parts EP1, EP2, and EP3 may be a region where light is emitted by a light emitting element and may correspond to a unit constituting an image displayed on the display panel DP (see FIG. 18). In an embodiment, for example, each of the light emitting parts EP1, EP2, and EP3 may correspond to a region defined by the light emitting opening OP-PDL (see FIG. 18), particularly, a region defined by the lower surface of the light emitting opening OP-PDL (see FIG. 18).

The light emitting parts EP1, EP2, and EP3 may include the first light emitting part EP1, the second light emitting part EP2, and the third light emitting part EP3. The first light emitting part EP1, the second light emitting part EP2, and the third light emitting part EP3 may emit light of a first color, light of a second color, and light of a third color, respectively. The light of the first color, the light of the second color, and the light of the third color may be light of different colors. In an embodiment, for example, the first light emitting part EP1 may emit red light, the second light emitting part EP2 may emit green light, and the third light emitting part EP3 may emit blue light. However, a combination of colors is not limited thereto. In an embodiment, at least two or more of the light emitting parts EP1, EP2, and EP3 may emit light of a same color. In an embodiment, for example, the first to third light emitting parts EP1, EP2, and EP3 may all emit blue light or white light.

Among the light emitting parts EP1, EP2, and EP3, the third light emitting part EP3 emitting the light of the third color may include two sub-light emitting parts EP31 and EP32 spaced apart from each other in the second direction DR2. However, this is illustrative. As similarly to the other light emitting parts EP1 and EP2, the third light emitting part EP3 may be provided as one pattern having a one-body shape, and at least one of the other light emitting parts EP1 and EP2 may include sub-light emitting parts spaced apart from each other. The disclosure is not limited to an embodiment.

The light emitting parts in the first row Rk may include the light emitting parts EP1, EP2, and EP3 that constitute the light emitting unit UT11 in the first row and the first column and the light emitting unit UT12 in the first row and the second column. The light emitting parts in the second row Rk+1 may include the light emitting parts EP1, EP2, and EP3 that constitute the light emitting unit UT21 in the second row and the first column and the light emitting unit UT22 in the second row and the second column. Some of the light emitting parts in the first row Rk and some of the light emitting parts in the second row Rk+1 may have symmetrical shapes. In an embodiment, for example, the first light emitting part EP1 and the second light emitting part EP2 of the light emitting unit UT21 in the second row and the first column and the first light emitting part EP1 and the second light emitting part EP2 of the light emitting unit UT11 in the first row and the first column may have line symmetry and arrangement with respect to an axis parallel to the second direction DR2. The third light emitting part EP3 of the light emitting unit UT21 in the second row and the first column and the third light emitting part EP3 of the light emitting unit UT11 in the first row and the first column may have line symmetry and arrangement with respect to an axis parallel to the first direction DR1. However, this is illustrative, and the disclosure is not limited thereto.

Hereinafter, the light emitting unit UT11 in the first row and the first column will be described. In FIG. 21B, a plurality of cathodes CE_1, CE_2, and CE_3, a plurality of pixel drivers PXCR, PXCG, and PXCB, and a plurality of connection wires CN1, CN2, and CN3 are illustrated for convenience of description. The cathodes CE_1, CE_2, and CE_3 may be separated from one another by the separator SPR and may be electrically disconnected from one another. In an embodiment, one light emitting unit UT may include the three light emitting parts EP1, EP2, and EP3. Accordingly, the light emitting unit UT may include the three cathodes CE_1, CE_2, and CE_3 (hereinafter, referred to as "first to third cathodes"), the three pixel drivers PXCR, PXCG, and PXCB, and the three connection wires CN1, CN2, and CN3. However, this is illustrative, and the number and arrangement of light emitting units UT may be variously modified or designed in various ways and are not limited to an embodiment.

The first to third pixel drivers PXCR, PXCG, and PXCB are electrically connected to light emitting elements constituting the first to third light emitting parts EP1, EP2, and EP3, respectively. The expression "connected" used herein includes not only physical direct contact but also electrical connection.

In an embodiment, the regions where the pixel drivers PXCR, PXCG, and PXCB are defined on the plane as illustrated in FIG. 21B may correspond to a unit in which transistors and capacitors constituting the pixel circuit PXCa (see FIG. 3) for driving a light emitting element of a pixel are repeatedly arranged.

The first to third pixel drivers PXCR, PXCG, and PXCB may be sequentially arranged in the first direction DR1. In an embodiment, the placement positions of the first to third pixel drivers PXCR, PXCG, and PXCB may be independently designed irrespective of the positions or shapes of the first to third light emitting parts EP1, EP2, and EP3.

In an embodiment, for example, the first to third pixel drivers PXCR, PXCG, and PXCB may be disposed at positions different from the positions at which the regions partitioned and defined by the separator SPR, that is, the first to third cathodes CE_1, CE_2, and CE_3 are disposed, or may be designed to have shapes and areas different from those of the first to third cathodes CE_1, CE_2, and CE_3. Alternatively, the first to third pixel drivers PXCR, PXCG, and PXCB may be disposed to overlap positions, at which the first to third light emitting parts EP1, EP2, and EP3 are present, and may be designed in shapes similar to the shapes of the regions (e.g., the first to third cathodes CE_1, CE_2, and CE_3) partitioned and defined by the separator SPR.

In an embodiment, the first to third pixel drivers PXCR, PXCG, and PXCB are illustrated in a rectangular shape, the first to third light emitting parts EP1, EP2, and EP3 have smaller areas than the first to third pixel drivers PXCR, PXCG, and PXCB and are arranged in a form different form that of the first to third pixel drivers PXCR, PXCG, and PXCB. The first to third cathodes CE_1, CE_2, and CE_3 are disposed at positions overlapping the first to third light emitting parts EP1, EP2, and EP3 and illustrated in an irregular shape.

Accordingly, as illustrated in FIG. 21B, the first pixel driver PXCR may be disposed at a position that partially overlaps the first light emitting part EP1, the second light emitting part EP2, and another adjacent light emitting unit UT. The second pixel driver PXCG may be disposed at a position that overlaps the first light emitting part EP1, the second light emitting part EP2, and the third light emitting part EP3. The third pixel driver PXCB may be disposed at a position that overlaps the third light emitting part EP3. However, this is illustrative, and the positions of the first to third pixel drivers PXCR, PXCG, and PXCB may be designed in various forms and arrangements independently of the light emitting parts EP1, EP2, and EP3 and are not limited to an embodiment.

The plurality of connection wires CN may be provided. The connection wires CN may be placed spaced apart from each other. In an embodiment, the one connection wire CN may electrically connect one pixel driver of the pixel drivers PXCR, PXCG, and PXCB and a light emitting element corresponding to the one pixel driver. In such an embodiment, the connection wire CN may correspond to a node (refer to the fourth node N4 in FIG. 3) where the light emitting element ED (see FIG. 18) is connected to the pixel circuit PXCa (see FIG. 3).

The connection wire CN may include a first connection unit (or the light emitting connection unit CEP) and a second connection unit (or the driving connection unit CDP). The light emitting connection unit CEP may be provided on one side of the connection wire CN, and the driving connection unit CDP may be provided on an opposite side of the connection wire CN.

The driving connection unit CDP may be a part of the connection wire CN connected to the pixel circuit PXCa. In an embodiment, the driving connection unit CDP may be connected to one electrode of a transistor constituting the pixel circuit PXCa. In an embodiment, for example, the driving connection unit CDP may be connected to the first electrode of the emission control transistor ET illustrated in FIG. 3. Accordingly, the position of the driving connection unit CDP may correspond to the position of a transistor (refer to the connection transistor TR of FIG. 18) of the pixel circuit PXCa that is physically connected to the connection wire CN. The light emitting connection unit CEP may be a part of the connection wire CN connected to the light emitting element. In an embodiment, the light emitting connection unit CEP may be connected to the cathode CE (see FIG. 18) of the light emitting element ED.

The light emitting unit UT may include the first to third connection wires CN1, CN2, and CN3. The first connection wire CN1 may connect the light emitting element that forms the first light emitting part EP1 and the first pixel driver PXCR, the second connection wire CN2 may connect the light emitting element that forms the second light emitting part EP2 and the second pixel driver PXCG, and the third connection wire CN3 may connect the light emitting element that forms the third light emitting part EP3 and the third pixel driver PXCB.

In an embodiment, the first to third connection wires CN1, CN2, and CN3 may connect the first to third cathodes CE_1, CE_2, and CE_3 and the first to third pixel drivers PXCR, PXCG, and PXCB, respectively. The first connection wire CN1 may include a first driving connection unit CDP1 connected to the first pixel driver PXCR and a first light emitting connection unit CEP1 connected to the first cathode CE_1. The second connection wire CN2 may include a second driving connection unit CDP2 connected to the second pixel driver PXCG and a second light emitting connection unit CEP2 connected to the second cathode CE_2. The third connection wire CN3 may include a third driving connection unit CDP3 connected to the third pixel driver PXCB and a third light emitting connection unit CEP3 connected to the third cathode CE_3.

The first to third driving connection units CDP1, CDP2, and CDP3 may be aligned in the first direction DR1. In an embodiment, as described above, the first to third driving connection units CDP1, CDP2, and CDP3 may correspond to the positions of connection transistors constituting the first to third pixel drivers PXCR, PXCG, and PXCB, respectively. In one pixel, the connection transistor TR may be a transistor that includes, as one electrode, a connection node to which the pixel circuit PXCa and the light emitting element ED are connected and may correspond to, for example, the emission control transistor ET of FIG. 3. According to an embodiment of the disclosure, the shapes, positions, or arrangements of pixel drivers of all pixels may be simply configured and designed irrespective of the shapes, sizes, or emission colors of light emitting parts.

In an embodiment, the first to third light emitting connection units CEP1, CEP2, and CEP3 may be disposed at positions not overlapping the light emitting parts EP1, EP2, and EP3 when viewed from above the plane. As will be described below, each of the light emitting connection units CEP1, CEP2, and CEP3 of the connection wire CN may be a part to which the light emitting element ED (see FIG. 18) is connected and in which the tip portion TP (see FIG. 18) is defined and therefore may be provided at a position not overlapping the light emitting opening OP-PDL (see FIG. 18). That is, the light emitting connection units CEP1, CEP2, and CEP3 may be disposed at positions spaced apart from the light emitting parts EP1, EP2, and EP3 in the cathodes CE_1, CE_2, and CE_3. The cathodes CE_1, CE_2, and CE_3 may include partial regions protruding from the light emitting parts EP1, EP2, and EP3 when viewed from above the plane to connect to the connection wires CN1, CN2, and CN3 at the positions where the light emitting connection units CEP1, CEP2, and CEP3 are disposed.

In an embodiment, for example, the first cathode CE_1 may include, at a position not overlapping the first light emitting part EP1, a protrusion protruding from the first light emitting part EP1 to connect with the first connection wire CN1 at the position where the first light emitting connection unit CEP1 is disposed, and the first light emitting connection unit CEP1 may be provided on the protrusion.

In an embodiment, the first driving connection unit CDP1 where the first pixel driver PXCR, particularly, the first connection wire CN1 is connected to the connection transistor TR (see FIG. 18) may be defined at a position not overlapping the first light emitting part EP1 when viewed from above the plane. According to an embodiment, the first connection wire CN1 may be disposed on the first light emitting part EP1, and thus the first cathode CE_1 and the first pixel driver PXCR spaced apart from each other may be easily connected.

In an embodiment, the third driving connection unit CDP3 where the third pixel driver PXCB, particularly, the third connection wire CN3 is connected to the connection transistor TR may be defined at a position not overlapping the third light emitting connection unit CEP3 and may be disposed at a position overlapping the third light emitting part EP3 when viewed from above the plane. According to an embodiment, the third cathode CE_3 and the third pixel driver PXCB may be connected through the third connection wire CN3. Accordingly, in the design of the third pixel driver PXCB, restrictions according to the position or shape of the third light emitting part EP3 may be reduced, and thus the degree of freedom in design may be improved.

Returning to FIG. 21A, the light emitting parts in the second row Rk+1 may include light emitting parts having line symmetry and arrangement with the light emitting units UT11 and UT12 in the first row with respect to an axis parallel to the first direction DR1 or the second direction DR2. In such an embodiment, due to the shapes and arrangement of the light emitting units UT11 and UT12 in the first row, the light emitting units UT21 and UT22 in the second row may be substantially composed of or defined by light emitting parts having a form in which the light emitting units UT11 and UT12 in the first row are shifted in the first direction DR1 or the second direction DR2. That is, the light emitting unit UT21 in the second row and the first column may be composed of or defined by light emitting parts having the same shape as the light emitting unit UT12 in the first row and the second column. The light emitting unit UT22 at the second row and the second column may be composed of or defined by light emitting parts having the same shape as the light emitting unit UT11 in the first row and the first column.

Accordingly, in an embodiment, connection wires CN-c disposed in the light emitting unit UT21 in the second row and the first column may have a same shape and arrangement as the connection wires CN1, CN2, and CN3 disposed in the light emitting unit UT12 in the first row and the second column. In such an embodiment, connection wires CN-d disposed in the light emitting unit UT22 in the second row and the second column may have the same shape and arrangement as the connection wires CN1, CN2, and CN3 disposed in the light emitting unit UT11 in the first row and the first column.

Referring to FIG. 21C, the anode AE of the light emitting element according to an embodiment of the disclosure may be commonly provided for the plurality of light emitting parts EP1, EP2, and EP3. That is, the anode AE may be formed as one integrated layer in the entire display area DA. Accordingly, the layer of the anode AE may be disposed to overlap the separator SPR. Alternatively, the anodes AE of the light emitting elements may be formed as independent conductive patterns spaced apart from one another and may be electrically connected to one another through other conductive layers. Accordingly, the patterns of the anodes AE may be disposed so as not to overlap the separator SPR.

In an embodiment, as described above, the first driving voltage ELVDD (see FIG. 3) may be applied to the anode AE, and a common voltage may be provided to all of the light emitting parts. The anode AE may be connected to the first power line PL1 (see FIG. 3), which provides the first driving voltage ELVDD (see FIG. 3), in the non-display area NDA or may be connected to the first power line PL1 (see FIG. 3) in the display area DA and is not limited to an embodiment. In the latter case, the first power line PL1 (see FIG. 3) may be disposed in the non-display area NDA (see FIG. 1), and the anode AE may have a shape that extends to the non-display area NDA (see FIG. 1).

In the cross-sectional views of FIGS. 18 and 20, the anode AE is illustrated as overlapping the light emitting opening OP-PDL and not overlapping the separator SPR. However, as illustrated in FIG. 21C, the anodes AE of the light emitting elements may have a one-body shape and may have a mesh or grid shape in which openings are defined in a partial region. That is, as long as a same first driving voltage ELVDD (see FIG. 3) is capable of being applied to the anode AE of each of the plurality of light emitting elements, the shape of the anode AE may be provided in various ways and is not limited to an embodiment.

In an embodiment, a plurality of openings OP-AE may be defined in the anode AE. The openings OP-AE may penetrate the layer of the anode AE. The openings OP-AE in the layer of the anode AE may be disposed at positions not overlapping the light emitting parts EP and may be defined at positions overlapping the separator SPR generally. The openings may facilitate releasing gas generated from an organic layer disposed under the anode AE, for example, the upper insulating layer UIL (see FIG. 18) that will be described below. Accordingly, the gas of the organic layer disposed under the light emitting element ED may be sufficiently discharged in a process of manufacturing the display panel DP, and gas discharged from the organic layer after the manufacture of the display panel DP may be reduced. Thus, the speed at which the light emitting element ED is degraded may be decreased.

According to an embodiment, the connection wire may be included between the light emitting element ED and the pixel driver. Accordingly, the light emitting element ED may be easily connected to the pixel driver even though only the shape of the cathode CE is changed without a change in the arrangement or shapes of the light emitting parts. Thus, the degree of freedom in design regarding the arrangement of the pixel driver may be improved, and the area or resolution of the light emitting part of the display panel DP may be easily increased.

Figure 22:
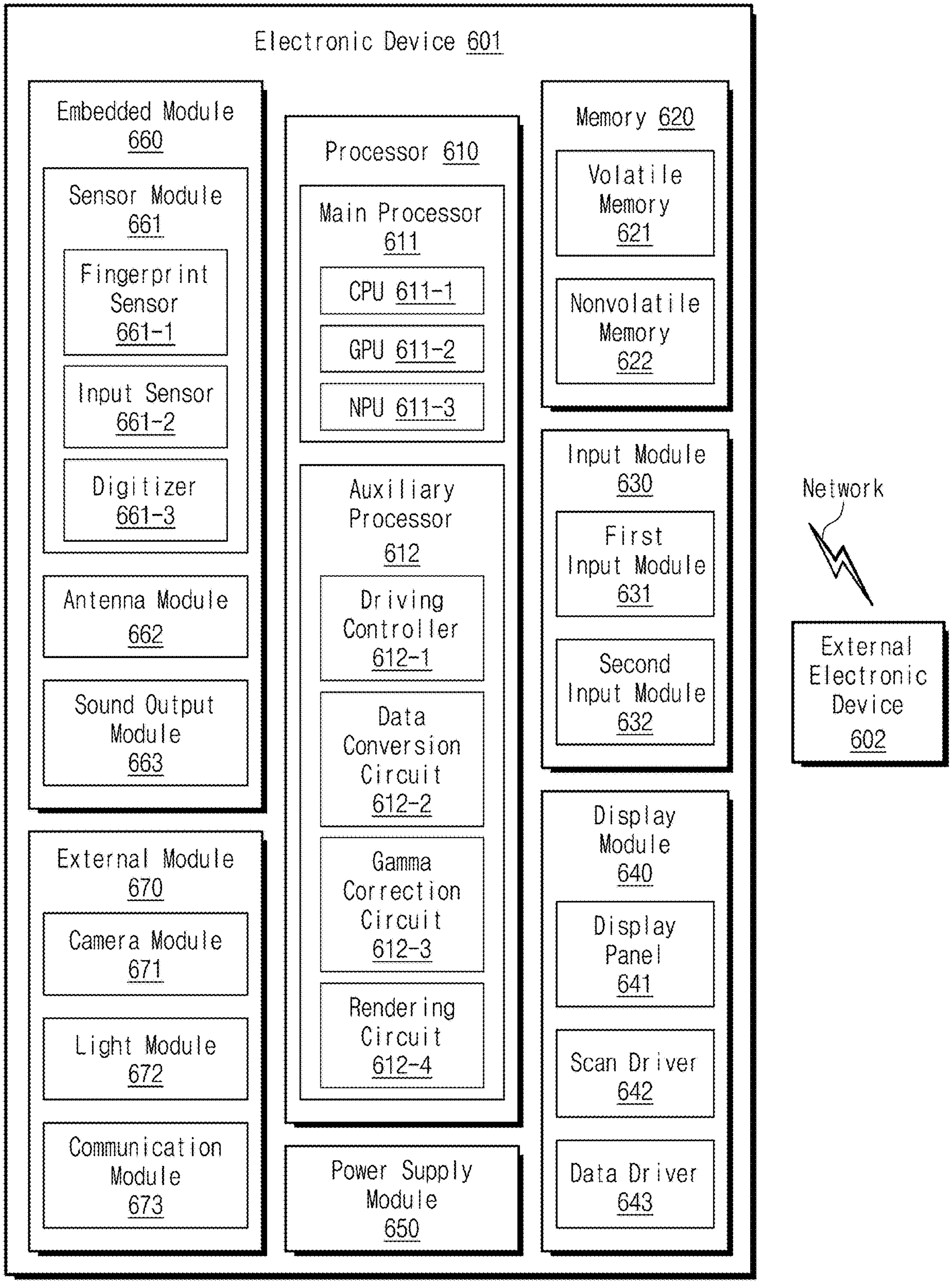
FIG. 22 is a block diagram of an electronic device, according to an embodiment of the disclosure.

FIG. 22 is a block diagram of an electronic device, according to an embodiment of the disclosure.

Referring to FIG. 22, an embodiment of an electronic device 601 outputs various pieces of information through a display module 640 within an operating system. When a processor 610 executes an application stored in a memory 620, a display module 640 provides application information to a user through a display panel 641.

The processor 610 obtains an external input through an input module 630 or a sensor module 661 and executes an application corresponding to the external input. In an embodiment, for example, when the user selects a camera icon displayed on the display panel 641, the processor 610 obtains a user input through an input sensor 661-2 and activates a camera module 671. The processor 610 provides image data corresponding to a captured image obtained through the camera module 671 to the display module 640. The display module 640 may display an image corresponding to the captured image through the display panel 641.

In an embodiment, for example, when personal information is authenticated on the display module 640, a fingerprint sensor 661-1 obtains entered fingerprint information as input data. The processor 610 compares input data obtained through the fingerprint sensor 661-1 with authentication data stored in the memory 620 and executes an application based on the comparison result. The display module 640 may display information, which is executed depending on the logic of the application, through the display panel 641.

In an embodiment, for example, when a music streaming icon displayed on the display module 640 is selected, the processor 610 obtains a user input through the input sensor 661-2 and activates the music streaming application stored in the memory 620. When a music play command is input by the music streaming application, the processor 610 provides sound information corresponding to the music play command to the user by activating a sound output module 663.

The operation of the electronic device 601 has been briefly described above. Hereinafter, a configuration of the electronic device 601 will be described in detail. Some of components of the electronic device 601, which will be described below, may be integrated and provided as one configuration, or the one configuration may be provided to be separated into two or more configurations.

Referring to FIG. 22, the electronic device 601 may communicate with an external electronic device 602 through a network (e.g., a short-range wireless communication network or a long-range wireless communication network). According to an embodiment, the electronic device 601 may include the processor 610, the memory 620, the input module 630, the display module 640, a power supply module 650, an embedded module 660, and an external module 670. According to an embodiment, in the electronic device 601, at least one of the above-described components may be omitted, or one or more other components may be added. According to an embodiment, some (e.g., the sensor module 661, an antenna module 662, or the sound output module 663) of the components described above may be integrated into another component (e.g., the display module 640).

The processor 610 may execute software to control at least another component (e.g., hardware or software component) of the electronic device 601 connected to the processor 610, and may process and calculate various types of data. According to an embodiment, as at least part of data processing or calculation, the processor 610 may store instructions or data received from other components (e.g., the input module 630, the sensor module 661 or a communication module 673) into a volatile memory 621, may process instructions or data stored in the volatile memory 621. The result data may be stored in a nonvolatile memory 622.

The processor 610 may include a main processor 611 and an auxiliary processor 612. The main processor 611 may include one or more of a central processing unit (CPU) 611-1 or an application processor (AP). The main processor 611 may further include one or more of a graphic processing unit (GPU) 611-2, a communication processor (CP), and an image signal processor (ISP). The main processor 611 may further include a neural processing unit (NPU) 611-3. The NPU 611-3 may be a processor that is specialized in processing an artificial intelligence model. The artificial intelligence model may be generated through machine learning. The artificial intelligence model may include a plurality of artificial neural network layers. The artificial neural network may be one of a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more of the networks, but may not be limited to the above-described example. In addition to a hardware structure, additionally or alternatively, the artificial intelligence model may include a software structure. At least two of the processing units and the processors that are described above may be implemented as one integrated component (e.g., a single chip) or may be implemented as independent components (e.g., a plurality of chips).

The auxiliary processor 612 may include a driving controller 612-1. The driving controller 612-1 may include an interface converting circuit and a timing control circuit. The driving controller 612-1 receives an image signal from the main processor 611, converts the data format of the image signal to be suitable for the interface specifications with the display module 640, and outputs image data. The driving controller 612-1 may output various control signals required to drive the display module 640. The configuration of the driving controller 612-1 is substantially similar to the driving controller 100 shown in FIG. 1, and thus detailed descriptions are omitted to avoid redundancy.

The auxiliary processor 612 may further include a data converting circuit 612-2, a gamma correcting circuit 612-3, and a rendering circuit 612-4. The data converting circuit 612-2 may receive the image data from the driving controller 612-1 and may compensates for the image data such that an image is displayed at a desired luminance based on characteristics of the electronic device 601 or setting of the user or may convert the image data to reduce power consumption or compensate for afterimages. The gamma correcting circuit 612-3 may convert the image data, a gamma reference voltage, or the like such that the image displayed on the electronic device 601 has desired gamma characteristics. The rendering circuit 612-4 may receive the image data from the driving controller 612-1 and may render the image data in consideration of a pixel arrangement of the display panel 641 applied to the electronic device 601. At least one selected from the data converting circuit 612-2, the gamma correcting circuit 612-3, and the rendering circuit 612-4 may be integrated into another component (e.g., the main processor 611 or the driving controller 612-1). At least one selected from the data converting circuit 612-2, the gamma correcting circuit 612-3, and the rendering circuit 612-4 may be integrated into a data driver 643.

The memory 620 may store various pieces of data, which are used by at least one component (e.g., the processor 610 or the sensor module 661) of the electronic device 601 and input data or output data for commands related thereto. The memory 620 may include at least one or more of the volatile memory 621 and the nonvolatile memory 622.

The input module 630 may receive, from the outside (e.g., the user or an external electronic device 602) of the electronic device 601, commands or data to be used in a components (e.g., the processor 610, the sensor module 661, or the sound output module 663) of the electronic device 601.

The input module 630 may include a first input module 631, through which the commands or data are input from the user, and a second input module 632 through which the commands or data are input from the external electronic device 602. The first input module 631 may include a microphone, a mouse, a keyboard, a key (e.g., a button), or a pen (e.g., a passive pen or an active pen). The second input module 632 may support a designated protocol capable of being connected to the external electronic device 602 by wire or wirelessly. According to an embodiment, the second input module 632 may include a high definition multimedia interface (HDMI), a universal serial bus (USB) interface, a secure digital (SD) card interface, or an audio interface. The second input module 632 may include a connector that may be physically connected to the external electronic device 602, for example, an HDMI connector, a USB connector, an SD card connector, or an audio connector (e.g., a headphone connector).

The display module 640 provides visual information to the user. The display module 640 may include the display panel 641, a scan driver 642, and the data driver 643. The display module 640 may further include a window, a chassis, a bracket, or the like for protecting the display panel 641. The display module 640 may further include a light emitting driver, a voltage generator, or the like. The voltage generator may output various voltages (e.g., the first and second driving voltages ELVDD and ELVSS (see FIG. 1)) used to drive the display panel 641. The configuration of the display panel 641, the scan driver 642, the data driver 643, and the voltage generator is substantially similar to the configuration of the display panel DP, the first and second gate driving circuits 300 and 350, the data driving circuit 200, and the voltage generator 400 shown in FIG. 1, and thus detailed descriptions are omitted to avoid redundancy.

The power supply module 650 supplies power to the components of the electronic device 601. The power supply module 650 may include a battery that charges a power voltage. The battery may include a non-rechargeable primary cell, a rechargeable secondary cell, a fuel cell, or the like. The power supply module 650 may include a power management integrated circuit (PMIC). The PMIC supplies optimized power to the above-described modules and modules which will be described below. The power supply module 650 may include a wireless power transmission/reception member electrically connected to the battery. The wireless power transmission/reception member may include a plurality of coil-shaped antenna radiators.

The electronic device 601 may further include the embedded module 660 and the external module 670. The embedded module 660 may include the sensor module 661, the antenna module 662, and the sound output module 663. The external module 670 may include the camera module 671, a light module 672, and the communication module 673.

The sensor module 661 may detect an input from the user's body or an input from a pen among the first input module 631, and may generate an electrical signal or data value corresponding to the input. The sensor module 661 may include at least one selected from the fingerprint sensor 661-1, the input sensor 661-2, and a digitizer 661-3.

The fingerprint sensor 661-1 may generate a data value corresponding to a fingerprint of the user. The fingerprint sensor 661-1 may include one of an optical-type fingerprint sensor, or a capacitance-type fingerprint sensor.

The input sensor 661-2 may generate a data value corresponding to coordinate information of an input by a body of the user or an input by a pen. The input sensor 661-2 generates the change in capacitance due to the input as the data value. The input sensor 661-2 may sense an input by a passive pen or may transmit or receive data to or from an active pen.

The input sensor 661-2 may also measure a biometric signal such as blood pressure, moisture, or body fat. In an embodiment, for example, when the user touches a part of the body to a sensor layer or sensing panel and does not move during a specific period, the input sensor 661-2 may detect the biometric signal and may output information desired by the user to the display module 640 based on a changes in electric fields caused by the part of the body.

The digitizer 661-3 may generate the data value corresponding to coordinate information of an input by the pen. The digitizer 661-3 generates an electromagnetic change amount due to the input as the data value. The digitizer 661-3 may sense input by the passive pen or transmit or receive data to or from the active pen.

At least one selected from the fingerprint sensor 661-1, the input sensor 661-2, and the digitizer 661-3 may be implemented as a sensor layer formed on the display panel 641 through a subsequent process. The fingerprint sensor 661-1, the input sensor 661-2, and the digitizer 661-3 may be placed on the upper side of the display panel 641, and one (e.g., the digitizer 661-3) of the fingerprint sensor 661-1, the input sensor 661-2, and the digitizer 661-3 may be placed on the lower side of the display panel 641.

At least two or more selected from the fingerprint sensor 661-1, the input sensor 661-2, and the digitizer 661-3 may be formed to be integrated into one sensing panel through a same process. When being integrated into one sensing panel, the sensing panel may be placed between the display panel 641 and a window placed on the upper side of the display panel 641. According to an embodiment, the sensing panel may be placed on a window, and the location of the sensing panel is not particularly limited thereto.

At least one selected from the fingerprint sensor 661-1, the input sensor 661-2, and the digitizer 661-3 may be built into the display panel 641. That is, at least one selected from the fingerprint sensor 661-1, the input sensor 661-2, and the digitizer 661-3 may be simultaneously formed through a process of forming elements (e.g., a light emitting element, a transistor, or the like) included in the display panel 641.

In an embodiment, the sensor module 661 may generate an electrical signal or a data value corresponding to the internal state or external state of the electronic device 601. In an embodiment, for example, the sensor module 661 may further include a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The antenna module 662 may include one or more antennas to transmit or receive the signal or power to or from an external source. According to an embodiment, the communication module 673 may transmit or receive the signal to or from the external electronic device 602 through the antenna suitable for a communication method. An antenna pattern of the antenna module 662 may be integrated into the input sensor 661-2 or one component (e.g., the display panel 641) of the display module 640.

The sound output module 663 may be a device for outputting an audio signal to the outside of the electronic device 601 and, for example, may include a speaker used for general purposes, such as multimedia playback or recording playback, and a receiver used only for receiving a call. According to an embodiment, the receiver may be implemented separately from the speaker or may be integrated with the speaker. A sound output pattern of the sound output module 663 may be integrated into the display module 640.

The camera module 671 may shoot a still image or a video image. According to an embodiment, the camera module 671 may include one or more lenses, an image sensor, or an image signal processor. The camera module 671 may further include an infrared camera capable of measuring the presence or absence of the user, a position of the user, a gaze of the user, or the like.

The light module 672 may provide light. The light module 672 may include a light emitting diode or a xenon lamp. The light module 672 may operate in conjunction with the camera module 671 or may operate independently from the camera module 671.

The communication module 673 may support establishing a wired or wireless communication channel between the electronic device 601 and the external electronic device 602 and performing communication through the established communication channel. The communication module 673 may include one or all of wireless communication modules such as a cellular communication module, a short-range wireless communication module, or a global navigation satellite system (GNSS) communication module, or wired communication modules such as a local area network (LAN) communication module or a power line communication module. The communication module 673 may communicate with the external electronic device 602 through a short-range communication network such as Bluetooth, WiFi direct, or infrared data association (IrDA) or a long-range communication network such as a cellular network, Internet, or a computer network (e.g., the LAN or a wide area network (WAN)). The above-mentioned various communication modules 673 may be implemented into one chip or may be respectively implemented into separate chips.

The input module 630, the sensor module 661, the camera module 671, or the like may be utilized to control an operation of the display module 640 in conjunction with the processor 610.

The processor 610 outputs commands or data to the display module 640, the sound output module 663, the camera module 671, or the light module 672 based on input data received from the input module 630. In an embodiment, for example, the processor 610 may generate image data in response to input data applied through a mouse, an active pen, or the like to output the generated image data to the display module 640 or may generate command data in response to the input data to output the generated command data to the camera module 671 or the light module 672. When no input data is received from the input module 630 during a specific period, the processor 610 may switch an operation mode of the electronic device 601 to a low-power mode or a sleep mode to reduce power consumed in the electronic device 601.

The processor 610 outputs commands or data to the display module 640, the sound output module 663, the camera module 671, or the light module 672 based on sensing data received from the sensor module 661. In an embodiment, for example, the processor 610 may compare authentication data authorized by the fingerprint sensor 661-1 with the authentication data stored in the memory 620, and then may execute an application depending on the comparison result. The processor 610 may execute commands or may output corresponding image data to the display module 640 based on sensing data sensed by the input sensor 661-2 or the digitizer 661-3. When the sensor module 661 includes a temperature sensor, the processor 610 receives temperature data regarding the measured temperature from the sensor module 661 and may further perform luminance correction on image data based on the temperature data.

The processor 610 may receive measurement data regarding the presence or absence of the user, the user's location, and the user's gaze from the camera module 671. The processor 610 may further perform luminance correction on the image data based on the measurement data. In an embodiment, for example, the processor 610 that determines the presence or absence of the user through an input from the camera module 671 may output image data, of which the luminance is corrected, to the display module 640 through the data converting circuit 612-2 or the gamma correcting circuit 612-3.

Some of the components may be connected to each other through communication methods between peripheral devices, for example, a bus, a general purpose input/output (GPIO), a serial peripheral interface (SPI), a mobile industry processor interface (MIPI), or an ultra-path interconnect (UPI) link and may exchange a signal (e.g., commands or data) between each other. The processor 610 may communicate with the display module 640 through a mutually promised interface, and for example, may use any one of the above-described communication methods, and the disclosure is not limited to the above-described communication methods.

The electronic device 601 according to various embodiments disclosed in the specification may be implemented with various types of devices. The electronic device 601 may be a portable communication device (e.g., a smart phone), a computer device, a portable multimedia device, a portable medical device, a camera, a wearable device, or a home appliance. The electronic device 601 according to an embodiment of this specification may not be limited to the above-described devices.

According to an embodiment of the disclosure, the number of scan driving circuits and the number of emission control circuits, which are included in a gate driving circuit, may be reduced by reducing the number of scan signals and the number of emission control signals, which are applied to a pixel. As a result, the width of the non-display area of a display panel may be reduced.

In such an embodiment, even when the number of scan signals decreases, a pixel circuit may be provided to accurately write a data voltage to a first node during a data write period and to stably perform a compensation operation during a compensation period.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:

a display panel including a pixel, wherein the pixel includes:

a light emitting element including an anode connected to a first power line and a cathode;

a first transistor connected between the cathode and a second power line, and comprising a gate electrode connected to a first node, wherein the first transistor operates based on a potential of the first node;

a second transistor connected between a second node and a data line, and comprising a gate electrode connected to a first scan line, wherein the second transistor receives a first scan signal through the first scan line;

a first capacitor between the first node and the second node;

a third transistor connected between a first electrode of the first transistor and the first node, and comprising a gate electrode connected to a second scan line, wherein the third transistor receives a second scan signal through the second scan line;

a second capacitor connected between the second node and the first power line; and a fourth transistor comprising a gate electrode connected to the second scan line to initializes the second node in response to the second scan signal during an initialization period.

2. The display device of claim 1, wherein the pixel further includes:

a fifth transistor which initializes the cathode in response to a third scan signal during a cathode initialization period; and an emission control transistor connected between the first electrode of the first transistor and the cathode, wherein the emission control transistor receives an emission control signal.

3. The display device of claim 2, wherein the third scan signal is activated before the second scan signal, wherein during the cathode initialization period, the third scan signal and the emission control signal have active levels, and the first scan signal and the second scan signal have inactive levels, wherein during the initialization period lagging behind the cathode initialization period, the second scan signal, the third scan signal, and the emission control signal have active levels, and the first scan signal has an inactive level, and wherein the cathode is initialized during the cathode initialization period, and the cathode, the first node, and the second node are initialized during the initialization period.

4. The display device of claim 3, wherein during a compensation period lagging behind the initialization period, the second scan signal has an active level, and the first scan signal and the emission control signal have inactive levels, and wherein the compensation period overlaps an active period of the third scan signal.

5. The display device of claim 4, wherein a data write period is subsequent to the compensation period, wherein during the data write period, the first scan signal has an active level, and wherein during the data write period, the second scan signal, the third scan signal, and the emission control signal have inactive levels.

6. The display device of claim 2, wherein the fifth transistor includes:

a first electrode connected to the first power line;

a second electrode connected to the cathode; and a gate electrode configured to receive the third scan signal.

7. The display device of claim 2, wherein the fifth transistor includes:

a first electrode connected to a first initialization voltage line which transmits a first initialization voltage;

a second electrode connected to the cathode; and a gate electrode configured to receive the third scan signal.

8. The display device of claim 1, wherein the fourth transistor further includes:

a first electrode connected to the second node; and a second electrode connected to the second power line, wherein the gate electrode of the fourth transistor receive the second scan signal through the second scan line.

9. The display device of claim 1, wherein the fourth transistor further includes:

a first electrode connected to the second node; and a second electrode connected to a second initialization voltage line which transmits a second initialization voltage, wherein the gate electrode of the fourth transistor receives the second scan signal through the second scan line.

10. The display device of claim 1, wherein the pixel further includes:

a fifth transistor which initializes the cathode in response to the second scan signal during the initialization period; and an emission control transistor connected between the first electrode of the first transistor and the cathode, wherein the emission control transistor receives an emission control signal, wherein during the initialization period, the second scan signal and the emission control signal have active levels, and the first scan signal has an inactive level, and wherein the cathode, the first node, and the second node are initialized during the initialization period.

11. The display device of claim 1, wherein the pixel further includes:

a fifth transistor which initializes the first electrode of the first transistor in response to a third scan signal during a first initialization period; and an emission control transistor connected between the first electrode of the first transistor and the cathode, wherein the emission control transistor receives an emission control signal.

12. The display device of claim 11, wherein the fifth transistor includes:

a first electrode connected to the first power line;

a second electrode connected to the first electrode of the first transistor; and a gate electrode which receives the third scan signal.

13. The display device of claim 11, wherein the third scan signal is activated before the second scan signal, wherein during the first initialization period, the third scan signal and the emission control signal have active levels, and the first scan signal and the second scan signal have inactive levels, wherein during a second initialization period after the first initialization period, the second scan signal, the third scan signal, and the emission control signal have active levels, and the first scan signal has an inactive level, and wherein the first electrode of the first transistor is initialized during the first initialization period, and the first electrode of the first transistor and the first node and the second node are initialized during the second initialization period.

14. The display device of claim 13, wherein during a compensation period after the second initialization period, the second scan signal has an active level, and the first scan signal, the third scan signal, and the emission control signal have inactive levels, and wherein the compensation period does not overlap an active period of the third scan signal.

15. A display device comprising:

a display panel including a pixel, a first scan line, a second scan line, an emission control line, a first power line, a second power line, and a data line;

a first scan driving circuit connected to the first scan line;

a second scan driving circuit connected to the second scan line; and an emission driving circuit connected to the emission control line, wherein the pixel includes:

a light emitting element including an anode connected to the first power line and a cathode;

a first transistor connected between the cathode and the second power line and comprising a gate electrode connected to a first node, wherein the first transistor operates based on a potential of the first node;

a second transistor connected between a second node and the data line, and comprising a gate electrode connected to the first scan line;

a first capacitor between the first node and the second node;

a third transistor connected between a first electrode of the first transistor and the first node, and comprising a gate electrode connected to the second scan line;

an emission control transistor connected between the first electrode of the first transistor and the cathode, and comprising a gate electrode connected to the emission control line;

a second capacitor connected between the second node and the first power line; and a fourth transistor comprising a first electrode connected to the second node and a gate electrode connected to the second scan line to initialize the second node in response to a second scan signal transmitted thereto through the second scan line during an initialization period.

16. The display device of claim 15, wherein the pixel further includes:

a fifth transistor connected to the cathode and a third scan line, wherein the fifth transistor initializes the cathode in response to a third scan signal during a cathode initialization period, and wherein the emission control transistor receives an emission control signal.

17. The display device of claim 16, wherein the second scan driving circuit provides the third scan signal to the third scan line.

18. The display device of claim 15, wherein the pixel further includes:

a fifth transistor connected to the first electrode of the first transistor and a third scan line, wherein the fifth transistor initializes the first electrode of the first transistor in response to a third scan signal during a cathode initialization period, and wherein the emission control transistor receives an emission control signal.

19. The display device of claim 18, further comprising:

a third scan driving circuit which provides the third scan signal to the third scan line.

20. An electronic device comprising:

a display panel including a pixel;

a panel driver driving the display panel;

a driving controller which controls a driving of the panel driver; and a main processor which provides an image signal to the driving controller, wherein the pixel includes:

a light emitting element including an anode connected to a first power line and a cathode;

a first transistor connected between the cathode and a second power line, and comprising a gate electrode connected to a first node, wherein the first transistor operates based on a potential of the first node;

a second transistor connected between a second node and a data line, and comprising a gate electrode connected to a first scan line, wherein the second transistor receives a first scan signal through the first scan line;

a first capacitor between the first node and the second node;

a third transistor connected between a first electrode of the first transistor and the first node, and comprising a gate electrode connected to a second scan line, wherein the third transistor receives a second scan signal through the second scan line;

a second capacitor connected between the second node and the first power line; and a fourth transistor comprising a gate electrode connected to the second scan line to initializes the second node in response to the second scan signal during an initialization period.

21. The display device of claim 1, wherein the first power line receives a first driving voltage, and the second power line receives a second driving voltage having a lower voltage level than the first driving voltage.

22. The display device of claim 21, wherein the second driving voltage is about zero (0) V.

23. The display device of claim 15, wherein the first power line receives a first driving voltage, and the second power line receives a second driving voltage having a lower voltage level than the first driving voltage.

24. The display device of claim 23, wherein the second driving voltage is about zero (0) V.

* * * * *